(12) United States Patent
Panda et al.

(10) Patent No.: US 12,436,965 B2
(45) Date of Patent: Oct. 7, 2025

(54) APPARATUSES, COMPUTER-IMPLEMENTED METHODS, AND COMPUTER PROGRAM PRODUCTS FOR DATA PERSISTENCE AND USE VIA DATA GRADUATION

(71) Applicants: ATLASSIAN PTY LTD., Sydney (AU); ATLASSIAN, INC., San Francisco, CA (US)

(72) Inventors: Lisa Panda, Mountain View, CA (US); Lennon Liao, Mountain View, CA (US); Peter Schoeffman, Mountain View, CA (US)

(73) Assignees: Atlassian Pty, Ltd., Sydney (AU); Atlassian, Inc., San Francisco, CA (US)

( * ) Notice: Subject to any disclaimer, the term of this patent is extended or adjusted under 35 U.S.C. 154(b) by 397 days.

(21) Appl. No.: 17/810,175

(22) Filed: Jun. 30, 2022

(65) Prior Publication Data
US 2024/0004895 A1 Jan. 4, 2024

(51) Int. Cl.
*G06F 16/25* (2019.01)
*G06F 21/44* (2013.01)

(52) U.S. Cl.
CPC ............ *G06F 16/258* (2019.01); *G06F 21/44* (2013.01)

(58) Field of Classification Search
CPC ............................... G06F 16/258; G06F 21/44
See application file for complete search history.

(56) References Cited

U.S. PATENT DOCUMENTS 6,782,403 B1 * 8/2004 Kino ..................... G06F 16/258
707/999.203
11,044,348 B1 6/2021 Cannon-Brookes et al.
(Continued)

FOREIGN PATENT DOCUMENTS

EP 3995953 A1 5/2022

OTHER PUBLICATIONS

Reporting Systems and Methods, U.S. Appl. No. 17/650,998, filed Feb. 14, 2022.
(Continued)

*Primary Examiner* — Jay A Morrison
(74) *Attorney, Agent, or Firm* — Alston & Bird LLP

(57) ABSTRACT

Embodiments provide improved mechanisms for converting data, via data graduation performed by an intermediary integration system, of data for use via a converted data access application. Embodiments include identifying a structured data object shell generated via a user-accessed application and stored via the intermediary integration system, causing converting of a specific configuration data object associated with a converted data access application from the structured data object shell by causing at least: translating a value of the structured data object shell to a first data value of the specific configuration data object, and setting a second data value of the specific configuration data object utilizing second data separate from the specific configuration data object, causing storing of the specific configuration data object via the converted data access application, wherein the storing of the specific configuration data object enables access to the specific configuration data object via the converted data access application.

20 Claims, 10 Drawing Sheets

(56) References Cited

U.S. PATENT DOCUMENTS

| | | | | |
|---|---|---|---|---|
| 11,190,623 | B1* | 11/2021 | Vydianathan | H04L 69/18 |
| 2004/0081183 | A1* | 4/2004 | Monza | H04M 3/5183 |
| | | | | 709/227 |
| 2004/0083482 | A1* | 4/2004 | Makagon | G06F 9/546 |
| | | | | 719/316 |
| 2022/0075796 | A1* | 3/2022 | Lindsay | G06F 16/258 |
| 2022/0141318 | A1 | 5/2022 | Cannon-Brookes et al. | |

OTHER PUBLICATIONS

Systems and Methods for Integrating Computer Applications, U.S. Appl. No. 17/654,352, filed Mar. 10, 2022.
Systems and Methods for Integrating Computer Applications, U.S. Appl. No. 17/654,357, filed Mar. 10, 2022.

* cited by examiner

APPARATUSES, COMPUTER-IMPLEMENTED METHODS, AND COMPUTER PROGRAM PRODUCTS FOR DATA PERSISTENCE AND USE VIA DATA GRADUATION

TECHNICAL FIELD

Embodiments of the present disclosure are generally directed to data conversion for use in a different application from a first application used to generate the data, and specifically to data graduation to convert data generated via an integration with a user-accessed application for use in a converted data access application.

BACKGROUND

In various contexts, a user may utilize a particular application for any of a myriad of functionality. Such functionality may generate data of a particular type that is utilized in such functionality, stored so that the user may return and re-access the data, and/or the like. Such data may be generic, such for example in a manner that is recognizable at a high level to a user that has utilized other applications as akin to other types of data objects of the same type from those other applications, and/or the functionality provided by the particular application accessed by the user may be limited to particular functions. For example, a user may be familiar with a table data object and/or functionality for generating and/or using a table data object from within any of a number of applications available for installation via the Internet. Similarly, a separate application may be available for the user to access that utilizes a different and/or more robust format of data object, and/or that provides advanced functionality for interacting with the type of data object but that is untethered from the first application the user accessed, such that accessing the more advanced application would ultimately lead the data to lose access to their already existing data objects.

Applicant has discovered various technical problems associated with conventional data management of applications. Through applied effort, ingenuity, and innovation, Applicant has solved many of these identified problems by developing the embodiments of the present disclosure, which are described in detail below.

BRIEF SUMMARY

In one aspect, a computer-implemented method includes identifying, via an intermediary integration system includes at least one server, a structured data object shell generated via a user-accessed application and stored via the intermediary integration system. The computer-implemented method also includes causing converting, via the intermediary integration system, of a specific configuration data object associated with a converted data access application from the structured data object shell by causing at least translating at least one value of the structured data object shell to at least a first data value of the specific configuration data object, and setting at least a second data value of the specific configuration data object utilizing second data separate from the specific configuration data object. The computer-implemented method also includes causing, via the intermediary integration system, storing of the specific configuration data object via the converted data access application, where the storing of the specific configuration data object enables access to the specific configuration data object via the converted data access application.

The computer-implemented method may also include the computer-implemented method further includes receiving an operational request corresponding to at least one operation associated with the converted data access application, receiving source authentication information associated with a user, and validating the source authentication information, where the structured data object shell is converted to the specific configuration data object based at least in part on the source authentication information associated with the user, and where the structured data object shell is generated before validation of the source authentication information.

The computer-implemented method may also include where the second data value of the specific configuration data object is associated with a higher-level source attribute or a permissions attribute.

The computer-implemented method may also include where the structured data object shell is associated with a first object data schema and where the specific configuration data object is associated with a second object data schema, and where translating the at least one value of the structured data object shell to at least the first data value of the specific configuration data object includes mapping a first data attribute of the first object data schema with a second data attribute of the specific configuration data object, and causing setting of the at least one value for the first data attribute to the first data value for the second data attribute.

The computer-implemented method may also include where the converted data access application and the intermediary integration system are associated with a shared entity.

The computer-implemented method may also include the computer-implemented method further includes configuring, via the intermediary integration system in communication with the user-accessed application, a user-facing application associated with the user-accessed application to provide access to first operation via the intermediary integration system, where the first operation includes a genericized operation corresponding to a specific operation of the converted data access application.

The computer-implemented method may also include the computer-implemented method further includes receiving, via the intermediary integration system, at least one operational request associated with the user-accessed application, and generating, via the intermediary integration system, the structured data object shell in response to the at least one operational request.

The computer-implemented method may also include the computer-implemented method further includes deleting the structured data object shell from the intermediary integration system.

The computer-implemented method may also include where the structured data object shell is configured associated with a first operations package and the specific configuration data object is configured associated with a second operations package.

The computer-implemented method may also include where the user-accessed application is associated with a user-facing application associated with a native look and feel, and where the user-facing application provides a first interface usable to generate the structured data object shell via an operation associated with the intermediary integration system, the first interface rendered based on the native look and feel associated with the user-accessed application.

The computer-implemented method may also include where the user-accessed application is associated with a user-facing application operating on at least one first computing device, where the intermediary integration system includes an applet simultaneously operating on the at least one first computing device.

The computer-implemented method may also include where the intermediary integration system causes generation of the specific configuration data object utilizing a particular conversion algorithm identified based at least in part on an object type associated with the structured data object shell.

The computer-implemented method may also include where the converted data access application is configured to provide first operation for interacting with the structured data object shell and second operation for interacting with the specific configuration data object.

The computer-implemented method may also include the computer-implemented method further includes receiving interaction data associated with the structured data object shell, the interaction data indicating a request to access a user-accessed application associated with the converted data access application, and in response to receiving the interaction data, initiating execution of a second user-facing application associated with the converted data access application.

The computer-implemented method may also include where the first operations set includes a first CRUD operations package and the second operations set includes a second CRUD operations package, the first CRUD operations package supporting at least one different CRUD operation than the second CRUD operations package.

The computer-implemented method may also include where the second operations package includes a specific operation performed at least in part via the converted data access application. Other technical features may be readily apparent to one skilled in the art from the following figures, descriptions, and claims.

In one aspect, an apparatus includes at least one processor. The apparatus also includes at least one memory storing instructions that, when executed by the at least one processor, cause the apparatus to identify a structured data object shell generated via a user-accessed application and stored via the intermediary integration system. The apparatus also includes at least one memory storing instructions that, when executed by the at least one processor, cause the apparatus to cause converting of a specific configuration data object associated with a converted data access application from the structured data object shell by causing at least translate at least one value of the structured data object shell to at least a first data value of the specific configuration data object, and set at least a second data value of the specific configuration data object utilizing second data separate from the specific configuration data object. The apparatus also includes at least one memory storing instructions that, when executed by the at least one processor, cause the apparatus to cause storing of the specific configuration data object via the converted data access application, where the storing of the specific configuration data object enables access to the specific configuration data object via the converted data access application.

The apparatus may also include where the instructions further cause the apparatus to receive an operational request corresponding to at least one operation associated with the converted data access application, receive source authentication information associated with a user, and validate the source authentication information, where the structured data object shell is converted to the specific configuration data object based at least in part on the source authentication information associated with the user, and where the structured data object shell is generated before validation of the source authentication information.

The apparatus may also include where the user-accessed application is associated with a user-facing application associated with a native look and feel, and where the user-facing application provides a first interface usable to generate the structured data object shell via an operation associated with the intermediary integration system, the first interface rendered based on the native look and feel associated with the user-accessed application. Other technical features may be readily apparent to one skilled in the art from the following figures, descriptions, and claims.

In one aspect, a non-transitory computer-readable storage medium, the computer-readable storage medium including instructions that when executed by at least one processor, cause the at least one processor to identify a structured data object shell generated via a user-accessed application and stored via the intermediary integration system. The non-transitory computer-readable storage medium also includes cause converting of a specific configuration data object associated with a converted data access application from the structured data object shell by causing at least translate at least one value of the structured data object shell to at least a first data value of the specific configuration data object, and set at least a second data value of the specific configuration data object utilizing second data separate from the specific configuration data object. The non-transitory computer-readable storage medium also includes cause storing of the specific configuration data object via the converted data access application, where the storing of the specific configuration data object enables access to the specific configuration data object via the converted data access application.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
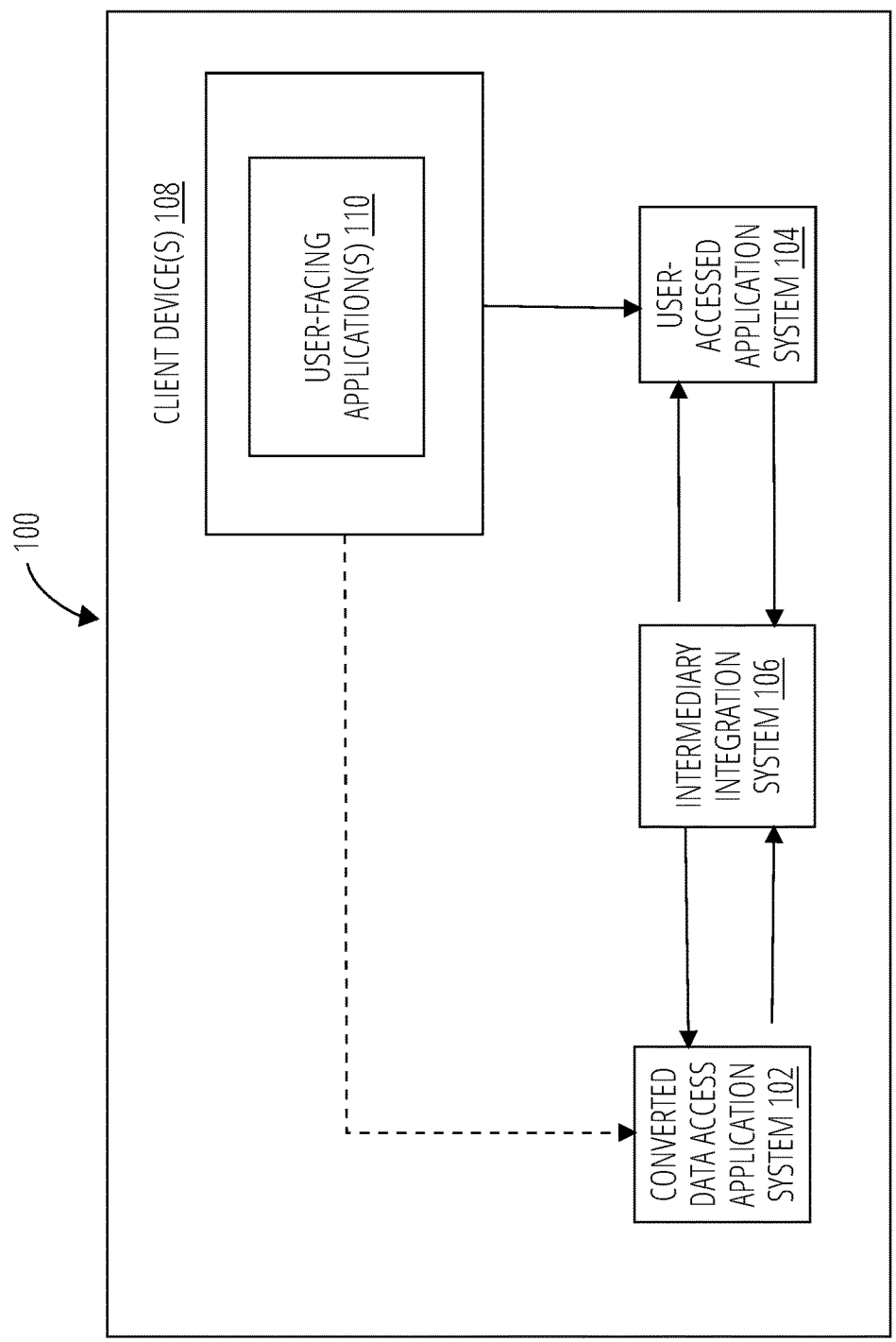
FIG. 1 illustrates an example system in which at least some embodiments of the present disclosure may operate.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, a user may utilize a particular application for any of a myriad of purposes. A given application may provide access to various operations performable by the application as particular functionality commonly associated with the given application. These operations may be utilized to generate data, process data, and/or otherwise manipulate data, for example, to produce one or more inputs, outputs, trigger processes, and/or the like. The generated, processed, or manipulated data may be stored in association with a particular user, user account, instance of the application, and/or the like, that enables persisted access to the stored data via the given application. Users may not have access to the stored data via another application (i.e., a secondary or non-native application) without additional processing or conversion.

This siloing of data to only the native applications that generated the data can be problematic for modern enterprises that are constantly onboarding new and different software applications to give users, employees, and the like best-in-class software tools and feature sets. It is important for software applications that are expected to have high usage within an enterprise to provide seamless secondary application integration and feature flexibility.

In some circumstances, a high-usage enterprise software application may be configured to incorporate operations generally associated with a different secondary application in order to meet a user need and increase usage metrics that are important to enterprise software platforms (e.g., monthly active users, etc.). These incorporated operations tend to be genericized, lite, or limited versions of those operations available in a native instance of the secondary software application.

Embodiments of the present disclosure provide for systems, apparatuses, computer-implemented methods, and computer program products for providing secondary software functionality within a user-accessed application and for "data graduation" as formally defined herein below. An example data graduation process may be operable to migrate and configure data objects generated via a user-accessed application integrated with an intermediary integration system having limited operations available so that such data objects might be readily used by a separate, second software applications, which is also referred to as a converted data access application below. Such a data graduation process might configure data objects associated with integrated operations associated with secondary software functionality (e.g., operations generally associated with functionality of the converted data application) executed by the user-accessed application integrated with the intermediary integration system for subsequent use via the converted data access application, either natively or through subsequent embedding of the converted data access application.

In some embodiments, data graduation includes process(es) that perform a particular conversion of structured data object shell(s) utilized by an intermediary integration system integrated with a user-accessed application to specific configuration data object(s) utilized by a converted data access application. The data graduation may occur via interaction with an intermediary integration system. The intermediary integration system interacts with systems for the user-accessed application and/or the converted data access application to enable the appropriate data conversions, translations, migrations, and/or other data manipulations.

Said differently, embodiments of the present disclosure enable particular operations typically associated with a secondary application to be performed via a user-accessed application to generate data (e.g., embodied in structured data object shell(s)) that is desirably configured to remain available for use by a converted data access application upon completion of data graduation. This allows a user to begin rudimentary or limited secondary application operations within a user-accessed application and then, subsequent to data graduation, access different, enhanced, and/or premium secondary application operations via engagement with a converted data access application (e.g., the secondary software application more commonly associated with the secondary application operations) without losing data and/or starting over. The secondary software application may take the place of the intermediary integration system as being embedded within the user-accessed application such that the expanded operations may be accessed within the same interface that the user was already utilizing, or alternatively may be accessed directly via a separate user-facing application entirely.

As one example context, consider an entity that provides a suite of associated software tools that are each associated with a separate code base (e.g., Atlassian, Inc., which is hereinafter referred to as "Atlassian" has developed and hosts a federated network and database platform that supports Jira Software™, Jira Service Desk™, Jira Core™, Confluence®, Bitbucket®, Atlassian Access™, Atlassian Cloud Apps™, Trello®, Statuspage™, Opsgenie®, Jira Align™, and the like). A user, Andy, who works as a product manager for developing a particular software tool, Beta Accounting Software ("Beta"), is associated with a user account for Trello® by Atlassian. Andy is a power user of Trello® and uses it for organizing operational workflows of his product management team, and those of various Beta engineering and marketing colleagues.

Trello® in this example serves as a user-accessed application and may be configured to provide integrated operations (i.e., secondary software application operations) that are not typically associated with Trello®, but that are more commonly associated with another Atlassian product called Confluence®. For example, Trello® may be configured to support certain integrated collaborative document management operations that are typically associated with Confluence® that enable a user to generate and/or edit objects embodying collaborative documents from within Trello®. Trello® may provide access to such limited operations via an embedded sub-application or sub-view that facilitates communication with an intermediary integration system configured to perform such operations. The intermediary integration system is separate from the hardware, software, and/or firmware that facilitates the native operations of Trello® as well as separate from the hardware, software, and/or firmware that facilitates the native operations of Confluence®. In this regard, the intermediary integration system may be thought of as a separate system that is permissioned for embedding into another application, such as Trello®, to provide access to "Confluence®-like" operations. In some circumstances, this integration may be provided in a manner that utilizes product-agnostic or native collaborative document management functionality that is not specifically associated with Confluence®, but that similarly is not typically part of the core operations offered by Trello®.

In other embodiments, the integrated collaborative document management operations may be product specific and visibly associated with Confluence® in the Trello® user interface. Indeed, the integrated operations may operate as a more limited or "lite" version of Confluence® that is accessed by a user through Trello®. For example, such integrated operations may include particular importing of Confluence® data for display and/or manipulation via Trello®.

In this regard, certain functionality and features of Confluence® are "integrated" within the Trello® instance made available to Andy. In one embodiment, Trello® is configured to provide access to certain functionality typical to Confluence® content collaboration, such as creating new pages, updating page content, and/or sharing page content with a limited list of other Beta team member user accounts. Such functionality may be native to Trello® or powered through a particular intermediary system that will facilitate data graduation to Confluence® as well, but made available all from within a launched instance of Trello®, such that Andy may utilize such functionality from within his Trello® instance without additional manual configuration for accessing Confluence® directly.

This type of cross-product integration may operate to familiarize Andy with operations typically associated with Confluence® and perhaps even to encourage Andy to directly use Confluence® in circumstances where he finds the integrated operations are useful and other premium or native only operations of Confluence® might be desired. In still other embodiments, Trello®, Confluence®, or some intermediary system may be configured to store and parse Andy's Trello® interactions to determine that certain of Andy's programmatically predicted goals might be more efficiently accomplished using features supported by Andy's direct use of Confluence®. Some embodiments may prompt and/or otherwise automatically display indications that full access to Confluence® may be desirable when such programmatically predicted goals indicate as such.

To provide such integrated operations, Trello® user interfaces rendered to Andy's device (e.g., via a Trello® user-facing application executing on Andy's device) are configured to provide interface elements that enable use of Trello® and some limited functionality typically associated with Confluence®. In some embodiments, to support this integration, Andy's user account for accessing Atlassian software tools may be automatically or manually provisioned to access some limited instance of Confluence® in addition to his standard Trello Provisioning®, such as to support importing of data from Confluence®. For example, Trello® systems, Confluence® systems, and/or other Atlassian systems associated with providing access to such software tools may automatically provision Andy's user account as a limited user account with respect to Confluence®. Should Andy's limited use of the functionality typically associated with Confluence® cause him to determine that he would like access to premium Confluence® functionality from within Trello®, and/or would like to access Confluence® independently via a corresponding standalone user-facing application, Andy may proceed to request full provisioning of his user account with respect to Confluence®.

Transitioning from a limited use of operations typically associated with Confluence® features from within Trello® to a more robust use of Confluence® within the native Confluence® application presents significant technical challenges beyond mere user account application provisioning. Indeed, data loss is an ever-present threat. As Andy begins accessing operations for creating Confluence® pages or other data akin to such Confluence® pages from within Trello®, he is also creating stored data objects (i.e., structured data object shell(s)) that embody such pages.

To avoid losing the Confluence® pages that Andy have created using Trello®, systems configured as discussed herein initiate a data graduation process that converts and configures the structured data object shell(s) created and/or stored via Trello® in a manner that causes such data to be accessible and processable via Confluence® if and when Andy turns to access Confluence® as a converted data access application. Upon completion of such data graduation process(es), Andy may seamlessly access Confluence® directly (or access embedded functionality within Trello® that is powered by the complete systems as Confluence® natively) to edit or supplement any of the Confluence® pages that were previously created using Trello® without losing data or having to undertake significant excess and/or technical steps to manually port over or reconfigure the structured data object shell(s).

It should be appreciated that, in other circumstances, limited access of multiple software tools may be enabled from within a single user-accessed software application in the manner described. For example, Trello® may be configured in accordance with embodiments herein described to provide Andy with access to limited operations typically associated with Confluence®, limited operations typically associated with Jira Software™, and limited operations typically associated with Jira Service Desk™—all from within a single instance of Trello®. In this regard, Andy may access integrated operations typically associated with each of these software tools without requiring interaction with additional user-facing applications, and without additional configuration or manual data conversion steps by Andy once access to the corresponding converted data access application is desired. Such multi-app access within a single user-accessed software application may cause Andy to transition to using each of the multiple secondary applications within premium or native instances thereof without losing data or undertaking cumbersome manual processes.

In some embodiments, an intermediary integration system associated with Trello® and/or Confluence®, but distinct from each, may be the entity that actually maintains one or more portions of data and/or executes the data graduation process. Operations accessible via this intermediary integration system may be made be integrated into any of a myriad of applications (e.g., via embedding). Access to the intermediary integration system may not require as much configuration of permissions and/or access credentials to utilize, and/or generally may be configured to be less restrictive than access to a corresponding converted data access application.

In some embodiments, upon completion of data graduation process(es), a user-accessed application may switch from embedding access to integrated operations facilitated via the intermediary integrated system to a complete suite or operational package facilitated via the converted access data application system in a manner not noticeable to the user. For example, continuing the Trello® and Confluence® example, once Andy performs data graduation to Confluence®, his instance of Trello® may directly embed access to operations facilitated via the full Confluence® systems rather than a corresponding intermediary integrated system (e.g., via API calls to such Confluence® systems) without this switch in systems providing access to such operations being noticeable to the user.

By utilizing a separate intermediary integration system, access and/or other configuration of the intermediary integration system may be configured separate to access and/or other configuration to Confluence® itself. Additionally, the integrated operations performable by the intermediary integration system—and thereby the corresponding computing hardware required to facilitate such integrated operations—may similarly be reduced. In this regard, a lightweight and more easily accessible environment may be made available for integration without affecting or otherwise impacting the system that facilitates the corresponding full application in any way. This further enables integration into other products (e.g., by embedding the integrated operations facilitated by the intermediary integration system) to be performed with better ease and agility by reducing the complexity of the architecture that may be associated with a full application as a product, without sacrificing data access upon a user's desire to utilize the full application (even as an embedded product into the same application as the intermediary integrated system) at a later time.

Additionally, it will be appreciated that integrated operations and/or data graduation as discussed herein need not be limited to use with a suite of software applications offered from a single entity (e.g., Atlassian). Instead, the inventive concepts herein described can be leveraged to enable use of integrated operations of any secondary application within a user-accessed application regardless of the entity that offers or hosts each respective software application. As such, the descriptions above regarding Atlassian-to-Atlassian integrations and data graduations should not limit the scope and spirit of the disclosure.

Definitions

"Computing device" refers to any computer, processor, circuitry, and/or other executor of computer instructions that is embodied in hardware, software, firmware, and/or any combination thereof. Non-limiting examples of a computing device include a computer, a processor, an application-specific integrated circuit, a field-programmable gate array, a personal computer, a smart phone, a laptop, a fixed terminal, a server, a networking device, and a virtual machine.

"Converted data access application" refers to an executable code base that performs a particular set of operations utilizing specific configuration data object(s), and that is accessible to an intermediary integration system for generating and/or storing specific configuration data object(s) converted via data graduation from structured data object shell(s). Converted data access applications are sometimes referenced herein for simplicity as secondary software applications, premium secondary software applications, or native secondary software applications.

"Data attribute" refers to electronically managed data representing a variable or particular criteria or property having a particular value or status. The value may be statically fixed or dynamically assigned. In some embodiments, a data attribute embodies a particular property of a data object.

"Data value" refers to electronically managed data representing a particular value for a particular data attribute.

"Data graduation" and "data graduation process" refer to one or more data-driven process(es) that transfer, configure, structure, migrate, and otherwise transform structured data object shell(s) created by a user-accessed software application to a specific configuration data object that is structured for seamless access by a converted data access application. Data graduation enables data that is generated based on user engagement within a user-accessed software application of integrated operations associated with a secondary application to be used within a converted data access application (i.e., a native instance of the secondary application). Without data graduation, data that is generated based on user engagement within a user-accessed software application of integrated operations associated with a secondary application would be lost at least, that is, with respect to future usage within the secondary application.

"Entity" refers to a person, company, or other organizational structure that controls one or more system(s). In some embodiments, an entity is associated with particular administrative credentials that define access to operation via a particular system.

"Executable code base" refers to computer program code stored in one or a plurality of locations that is executed and/or executable via one or more computer devices embodied in hardware, software, firmware, and/or any combination thereof. An executable code base defines at least one particular application to be executed by one or more computing devices. In some embodiments, a memory, storage, and/or other computing device includes and/or otherwise is structured to define any number of separate executable code bases (e.g., a first application and a second application). Alternatively or additionally, in some embodiments, separate executable code bases are embodied by separate computing devices (e.g., a first server embodying a first executable code base and a second server embodying a second executable code base).

"Higher-level source attribute" refers to a data attribute associated with an organizational hierarchy of data stored and/or processed by a converted data access application, where the higher-level source attribute indicates an identifier or other object reference utilized to arrange a specific configuration data object in the converted data access application. For example, in one example context of a system for managing data representing books, a data object representing a book having a particular identifier is a higher-level source attribute associated with a data object representing a chapter, which is similarly a higher-level source attribute of a data object representing a page.

"Intermediary integration system" refers to computer-coded instructions, an executable code base, a selected service of federated service architecture, and/or a software application that is configured for execution via one or more computing device(s) separate from a user-facing application and a converted data access application. The computing device(s) of the intermediary integration system maintains data separate from the converted data access application and the user-accessed application, and facilitates access to at least partial operations typically associated with a converted data access application via a user-accessed application, and/or that facilitate conversion of structured data object shell(s) associated with a user-accessed application to specific configuration data object(s) associated with a converted data access application. In some embodiments, an intermediary integration system comprises at least one server and/or at least one database and operates on an executable code base that is separate and distinct from either of the executable codes bases embodied by the user-accessed application or the converted data access application.

"Object data schema" refers to a class, blueprint, or other organizational structure for data attributes, methods, and/or other data represented by or associated with interacting with a particular data object. In some embodiments, an object data schema embodies a particular object class in object-oriented programming.

"Operation" refers to any method, function, procedure, or other computer-implemented process performable via a particular computing device or system. Some operations receive input and produces output based on that input. Non-limiting examples of an operation include an application programming interface (API) call, a method call, a procedure call of a local application, a remote procedure call, and other execution of computer-coded instructions.

"Operational request" refers to electronically managed data from a first computing device or system indicating a request to perform a particular operation via an external computing system. In some embodiments, the operational request comprises an application programming interface (API) call represented by one or more network request(s). Non-limiting examples of an operational request include data embodying a request transmitted from a first system to a second system that causes the second system to perform particular operation.

"Operations package" refers to any number of operations that are performable associated with a particular data object. In some embodiments an operations package includes methods or functions of a particular instance of a data object.

"Permissions attribute" refers to electronically managed data defining ownership of and/or access to a particular data object, and/or operation associated with the particular data object.

"Shared entity" refers to an entity that is associated with particular administrative credentials that define access to, in whole or in part, two or more distinct systems. In some embodiments the two or more distinct systems embody separate applications that may share one or more operation via an intermediary integration system.

"Source authentication information" refers to electronically managed data usable to authenticate access to data associated with a user-accessed application, and/or validate authenticated access corresponding to data of a converted data access application via an intermediary integration system. Non-limiting examples of source authentication information includes a source identifier, an administrator identifier, user authentication credentials, and/or one or more validation token(s).

"Specific configuration data object" refers to structured electronically managed data organized in a manner that is processable, storable, and/or otherwise interpretable by a converted data access application. A specific configuration data object may be generated via interaction with a user-accessed application integrated with an intermediary integration system upon data graduation, and/or directly via a converted data access application.

"Structured data object shell" refers to structured electronically managed data generated via interaction with an intermediary integrated system accessible via a user-accessed application.

"User-accessed application" refers to a first executable code base that performs a particular first set of operations common to the user-accessed application and further provides at least some operation(s) that are not common to the user-accessed application and are more commonly associated with a converted data access application embodied by a second executable code base. The user-accessed application enables a user to access operations of the converted data access application without requiring a user to have fully provisioned a user account associated with the converted data access application. User engagement with operations of the converted data access application within the user-accessed application produces structured object shell(s) as defined above. In some embodiments, a user-accessed application may communicate with an intermediary integration system operating on a third executable code base to generate at least one structured data object shell. In still other embodiments, a user-accessed application may communicate with an intermediary integration system operating on a third executable code base during data graduation.

"User-facing application" refers to computer-coded instructions, an executable code base, and/or a software application that is configured for execution and/or access client-side via a user device to enable the user to interact with functionality provided by a native application or at least one remote executable code base. Non-limiting examples of a user-facing application include a native application executed on a user device and a browser application executed on a user device that is utilized to access a particular web-endpoint.

Example Systems and Apparatuses of the Disclosure

FIG. 1 illustrates an example system in which at least some embodiments of the present disclosure may operate. Specifically, FIG. 1 depicts an example system 100. The example system 100 includes a converted data access application system 102, user-accessed application system 104, intermediary integration system 106, and client device(s) 108. In some embodiments, one or more of the client device(s) 108 executes one or more user-facing application(s) 110 associated with one or more software application(s), for example to access operations associated with a converted data access application and/or a user-accessed application. In some embodiments, the user-facing application(s) 110 enables the client device(s) 108 to communicate with the converted data access application system 102 and/or user-accessed application system 104 to access such functionality, as described herein.

In some embodiments, the client device(s) 108 includes one or more user device(s) that provide a user access to execution of particular software application(s). In some embodiments, the client device(s) 108 includes or is embodied by one or more user device(s), for example a smartphone, tablet, personal computer, laptop, and/or the like. The client device(s) 108 may be configured to store one or more software application(s) installed to the client device(s) 108, for example via one or more memory(s) of the client device(s) 108. In some embodiments, the client device(s) 108 includes a single client device embodied by a single computing device or plurality of interacting computing devices. In other embodiments, the client device(s) 108 includes a plurality of client devices associated with a single user or a plurality of users.

In some embodiments, the client device(s) 108 maintains one or more user-facing application(s) 110. The user-facing application(s) 110 in some embodiments comprises one or more software application(s) downloaded and/or installed to the client device(s) 108. A user may utilize an app store, particular web endpoint, and/or the like to download and/or install any application of the user-facing application(s) 110 to the client device(s) 108. In some embodiments, the user may execute a particular user-facing application of the user-facing application(s) 110 on the client device(s) 108 to perform particular operation(s) facilitated by that particular user-facing application. For example, in some embodiments, the user-facing application(s) 110 includes a first user-facing application associated with accessing the converted data access application system 102, and/or a second user-facing application for accessing the user-accessed application system 104. Alternatively or additionally, in some embodiments, the user-facing application(s) 110 includes a user-facing application associated with the user-accessed application system 104, but does not yet include any user-facing application associated with the converted data access application system 102. The user-facing application associated with the converted data access application system 102 may be installed subsequently, for example after or simultaneously with performing data graduation associated with a user-accessed application corresponding to the user-accessed application system 104.

In some embodiments, the user-accessed application system 104 includes one or more server(s) and/or datastore(s) that supports operations of a particular user-accessed application. The server(s) and/or the datastore(s) in some embodiments embody cloud computing device(s) specially configured to execute one or more software application(s), for example embodying a user-accessed application. The computing device(s) of the user-accessed application system 104 may operate in conjunction with one another, or alone, to provide the functionality described herein.

In some embodiments, the user-accessed application system 104 supports a user-accessed application. The user-accessed application may provide functionality embodying any of a myriad of desired operations that generate, utilize, and/or otherwise interact with particular data objects embodying structured data object shell(s). Non-limiting examples of a user-accessed application include a word processing application, a generic list-making application, a spreadsheet and/or data management application, and/or the like. In this regard, a user may utilize a particular user account associated with the user-accessed application system 104 to initiate an authenticated session associated with the user-accessed application and access such operation(s). In some embodiments, a user account causes generation and/or storage of structured data object shell(s) that embody the data generated via the user-accessed application and/or utilized by the user-accessed application for one or more operations accessible via the user-facing application.

In some embodiments, the intermediary integration system 106 includes one or more server(s) and/or datastore(s) that supports software application(s) associated with performance of data graduation. The server(s) and/or the datastore(s) in some embodiments embody cloud computing device(s) specially configured to execute one or more software application(s), for example that facilitate generation and/or maintenance of structured data object shell(s) associated with a user-accessed application, and/or data graduation of structured data object shell(s) to specific configuration data object(s) associated with a converted data access application. The computing device(s) of the intermediary integration system 106 may operate in conjunction with one another, or alone, to provide the functionality described herein.

In some embodiments, the intermediary integration system 106 supports creation and/or storage of structured data object shell(s) associated with operations provided by the user-accessed application system 104. For example, in some embodiments the intermediary integration system 106 is responsible for storing and/or facilitating retrieval of the structured data object shell(s) for use via the user-accessed application system 104. Alternatively or additionally, in some embodiments, the intermediary integration system 106 shares one or more datastore(s) and/or server(s) with the user-accessed application system 104 to enable shared storage of structured data object shell(s). Additionally or alternatively still, in some embodiments, the intermediary integration system 106 performs one or more data conversion algorithm(s) from a first object data schema to a second object data schema associated with a specific configuration data object. Additionally or alternatively still, in some embodiments, the intermediary integration system 106 shares one or more datastore(s) and/or server(s) with the converted data access application system 102, and/or is otherwise communicable with the converted data access application system 102 to enable pushing of data from the intermediary integration system 106 to the converted data access application system 102.

In some embodiments, the intermediary integration system 106 is configured via execution of one or more software application(s) to perform data graduation process(es) by converting structured data object shell(s) for storage via a converted data access application system 102. The user-accessed application may provide access to integrated functionality embodying any of a myriad of desired operations that generate, utilize, and/or otherwise interact with particular data objects embodying structured data object shell(s). Non-limiting examples of a user-accessed application include a word processing application, a generic list-making application, a spreadsheet and/or data management application, and/or the like. In this regard, a user may utilize a particular user account associated with the user-accessed application system 104 to initiate an authenticated session associated with the user-accessed application and access such operation(s). In some embodiments, a user account causes generation and/or storage of structured data object shell(s) maintained via the user-accessed application system 104 that embody the data generated via the user-accessed application and/or utilized by the user-accessed application for one or more operations accessible via the user-facing application.

In some embodiments, the converted data access application system 102 includes one or more server(s) and/or datastore(s) that supports operations of a converted data access application. The server(s) and/or datastore(s) in some embodiments embody cloud computing device(s) specially configured to execute one or more software application(s), for example embodying a converted data access application. The computing device(s) of the converted data access application system 102 may operate in conjunction with one another, or alone, to provide the functionality described herein.

In some embodiments, the converted data access application system 102 supports a converted data access application. The converted data access application may provide access to any of a myriad of operations for interacting with specific configuration data object(s) associated with the converted data access application. The specific configuration data object(s) in some embodiments are configured in accordance with a particular object data schema that is recognizable, interpretable, and/or otherwise processable by the converted data access application system 102 via the corresponding converted data access application.

The converted data access application system 102 may provide access to any of a myriad of operations. In some embodiments, the converted data access application systems 102 is associated with a converted data access application that facilitates operation(s) for word processing, data processing, list creation and/or management, and/or the like, utilizing specific configuration data object(s). In some embodiments, the operations accessible via the converted data access application operating via the converted data access application system 102 are enhanced and/or expanded versions of the functionality provided by the intermediary integration system 106 via the user-accessed application facilitated by the user-accessed application system 104. For example, in some embodiments a user-accessed application provides (e.g., via integration with the intermediary integration system) for generation of a generic list (e.g., a bulleted list), and the converted data access application provides for generation of a selectable and/or updatable task list with task statuses, user assignment, and/or the like.

In some embodiments, the converted data access application system 102 and the user-accessed application system 104 are associated with a shared entity. In this regard, a single entity may have permissive access to, and/or perform configuration of, both the converted data access application system 102 and the user-accessed application system 104. In other embodiments, the converted data access application system 102 and user-accessed application system 104 are associated with different entities. In either such scenario, the intermediary integration system 106 may be specially configured to enable data graduation regardless of which entities control the converted data access application system 102 and/or user-accessed application system 104. In some embodiments, the same shared entity controls the intermediary integration system 106. In other embodiments, one of the entities that controls the converted data access application system 102 and/or user-accessed application system 104 similarly controls the intermediary integration system 106.

In some embodiments, the converted data access application system 102, user-accessed application system 104, intermediary integration system 106, and/or client device(s) 108 communicate over one or more communications network(s). In some embodiments, one or more of the communications network(s) is embodied in any of a myriad of network configurations. In some embodiments, the communication network(s) embody a public network (e.g., the Internet). In some embodiments, the communications network(s) embody a private network (e.g., an internal, localized, or closed-off network between particular devices). In some other embodiments, the communications network(s) embody a hybrid network (e.g., a network enabling internal communications between particular connected devices and external communications with other devices). The communications network(s) in some embodiments includes one or more base station(s), relay(s), router(s), switch(es), cell tower(s), communications cable(s) and/or associated routing station(s), and/or the like.

The converted data access application system 102, user-accessed application system 104, intermediary integration system 106, and/or client device(s) 108 each may communicate over a whole or a portion of one or more communications network(s). For example, each of the components of the system communicatively coupled to transmit data to and/or receive data from, for example, one another over the same or different wireless or wired networks embodying one or more wired and/or wireless communications network(s). Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over at least one communication network, the various embodiments are not limited to this particular architecture. In other embodiments, one or more computing entities share one or more components, hardware, and/or the like, or otherwise are embodied by a single computing device such that connection(s) between the computing entities are over the communications network(s) are altered and/or rendered unnecessary. In some embodiments, for example, the client device(s) 108 communicates with the converted data access application system 102 and/or user-accessed application system 104 via a first one or more communications network(s), for example via a public wireless communications network, whereas the intermediary integration system 106 communicates with the converted data access application system 102 and/or user-accessed application system 104 via a second one or more communications network(s), for example a private, hybrid, or similar public wireless communications network or a wired communications network.

Figure 2:
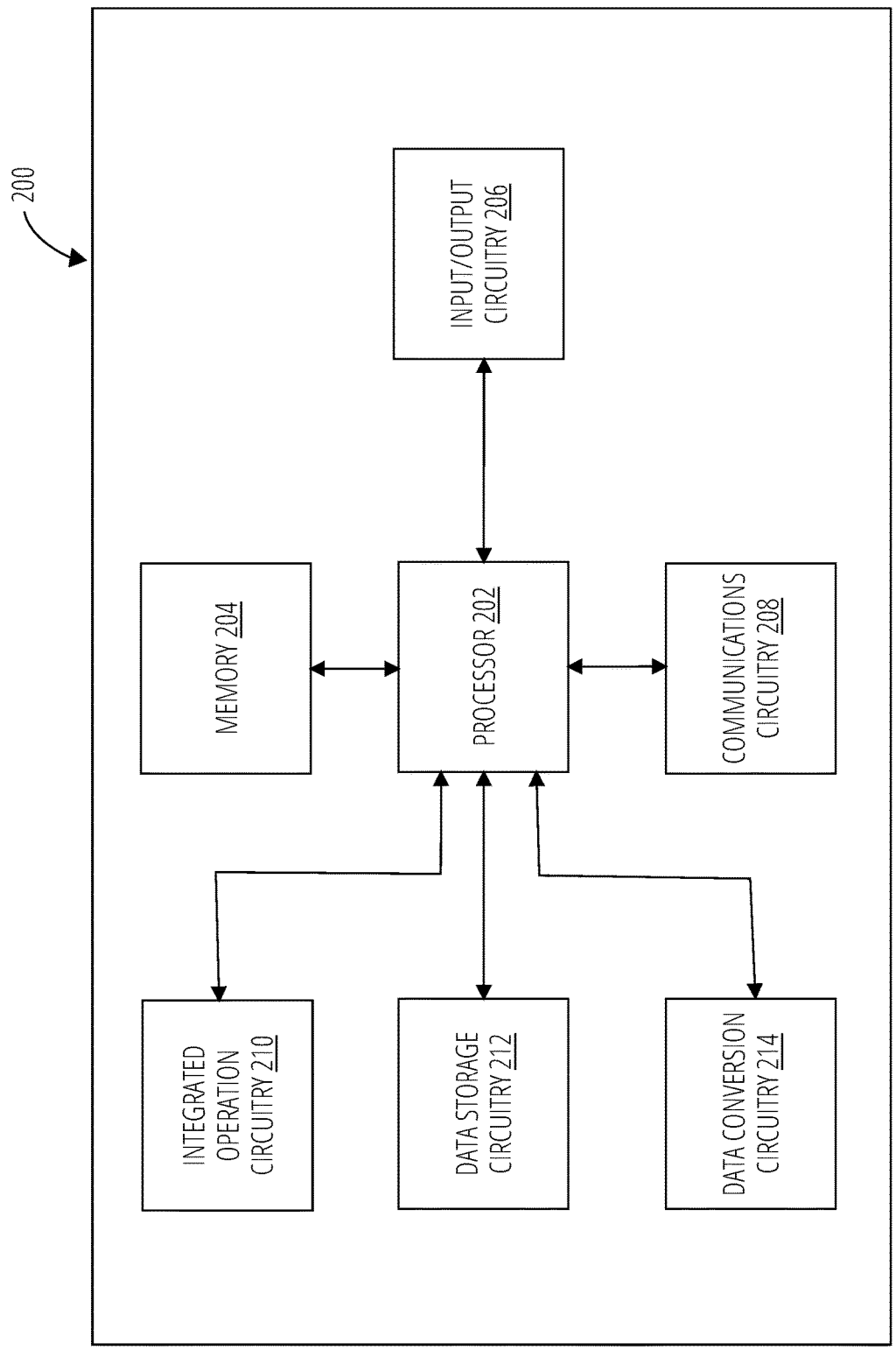
FIG. 2 illustrates a block diagram of an example apparatus in accordance with at least some embodiments of the present disclosure.

FIG. 2 illustrates a block diagram of an example apparatus in accordance with at least some embodiments of the present disclosure. Specifically, FIG. 2 depicts an example apparatus 200 specially configured in accordance with at least some example embodiments of the present disclosure. In some embodiments, the intermediary integration system 106 is embodied by one or more system(s), such as the apparatus 200 as depicted and described in FIG. 2. The apparatus 200 includes processor 202, memory 204, input/output circuitry 206, communications circuitry 208, integrated operation circuitry 210, data storage circuitry 212, and/or data conversion circuitry 214. In some embodiments, the apparatus 200 is configured, using one or more of the sets of circuitry 202, 204, 206, 208, 210, 212, and/or 214, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the allocation modeling apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with data graduation for accessing a converted data access application. In some embodiments, the processor 202 includes hardware, software, firmware, and/or a combination thereof, that generates, stores, and/or maintains structured data object shell(s) associated with a user-accessed application system 104. Additionally or alternatively, in some embodiments, the processor 202 includes hardware, software, firmware, and/or a combination thereof, that generates specific configuration data object(s) from structured data object shell(s) utilizing one or more conversion algorithm(s). Additionally or alternatively, in some embodiments, the processor 202 includes hardware, software, firmware, and/or a combination thereof, that stores and/or otherwise pushes specific configuration data object(s) to at least one system associated with a converted data access application.

In some embodiments, the apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

In some embodiments, the apparatus 200 includes communications circuitry 200. The communications circuitry 208 includes any means such as a device or circuitry embodied in either hardware or a combination of hardware and software that is configured to receive and/or transmit data from/to a network and/or any other device, circuitry, or module in communication with the data-driven identity validation apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a system associated with a converted data access application system and/or a user-accessed application system, and/or another external device in communication with the apparatus 200.

The integrated operation circuitry 210 includes hardware, software, firmware, and/or a combination thereof, that supports operation(s) facilitated in whole or in part via interaction with a user-accessed application. In some embodiments, the integrated operation circuitry 210 includes hardware, software, firmware, and/or any combination thereof, that establishes an authenticated connection with at least one system corresponding to a user-accessed application, for example based on first authentication credentials and/or permissions that enable access via the user-accessed application. Such authentication credentials and/or permissions may differ from additional authentication credentials required should the user-accessed application desire to access a converted data access application, for example upon completion of data graduation as described herein. Additionally or alternatively, in some embodiments, the integrated operation circuitry 210 includes hardware, software, firmware, and/or any combination thereof, that processes request(s) to perform operation(s) initiated associated with a user-accessed application. In some embodiments, integrated operation circuitry 210 includes a separate processor, specially configured field programmable gate array (FPGA), or a specially programmed application specific integrated circuit (ASIC).

The data storage circuitry 212 includes hardware, software, firmware, and/or a combination thereof, that supports functionality for generating, storing, and/or maintaining structured data object shell(s) convertible via one or more data graduation process(es). For example, in some embodiments, the data storage circuitry 212 includes hardware, software, firmware, and/or a combination thereof, that stores structured data object shell(s) associated with a particular user account and/or user-accessed application. Additionally or alternatively, in some embodiments, the data storage circuitry 212 includes hardware, software, firmware, and/or a combination thereof, that retrieves structured data object shell(s) associated with a user-accessed application for access associated with a particular user, user account, and/or user-accessed application. Additionally or alternatively, in some embodiments, the data storage circuitry 212 includes hardware, software, firmware, and/or a combination thereof, that maintains an integrated datastore that stores at least the structured data object shell(s) separate from other data objects utilized by a user-accessed application. Additionally or alternatively, in some embodiments, the data storage circuitry 212 includes hardware, software, firmware, and/or a combination thereof, that pushes and/or causes storage of specific configuration data object(s) to at least one datastore associated with a converted data access application. In some embodiments, the data storage circuitry 212 includes a separate processor, specially configured field programmable gate array (FPGA), or a specially programmed application specific integrated circuit (ASIC).

The data conversion circuitry 214 includes hardware, software, firmware, and/or a combination thereof, that performs one or more data graduation process(es). For example, in some embodiments, the data conversion circuitry 214 includes hardware, software, firmware, and/or a combination thereof, that applies conversion algorithm(s) to structured data object shell(s) associated with integrated operations via a user-accessed application to generate specific configuration data object(s) associated with a converted data access application. Additionally or alternatively, in some embodiments, the data conversion circuitry 214 includes hardware, software, firmware, and/or a combination thereof, that provisions and/or configures access to specific configuration data object(s) associated with a converted data access application. In some embodiments, the data conversion circuitry 214 includes a separate processor, specially configured field programmable gate array (FPGA), or a specially programmed application specific integrated circuit (ASIC).

Additionally or alternatively, in some embodiments, two or more of the sets of circuitries 202-214 are combinable. Alternatively or additionally, in some embodiments, one or more of the sets of circuitry perform some or all of the functionality described associated with another component. For example, in some embodiments, two or more of the sets of circuitry 202-214 are combined into a single module embodied in hardware, software, firmware, and/or a combination thereof. Similarly, in some embodiments, one or more of the sets of circuitry, for example the integrated operation circuitry 210, data storage circuitry 212, and/or data conversion circuitry 214, is/are combined with the processor 202, such that the processor 202 performs one or more of the operations described above with respect to each of these sets of circuitry 210-214.

Example Data Environments and Data Flows of the Disclosure

Figure 3:
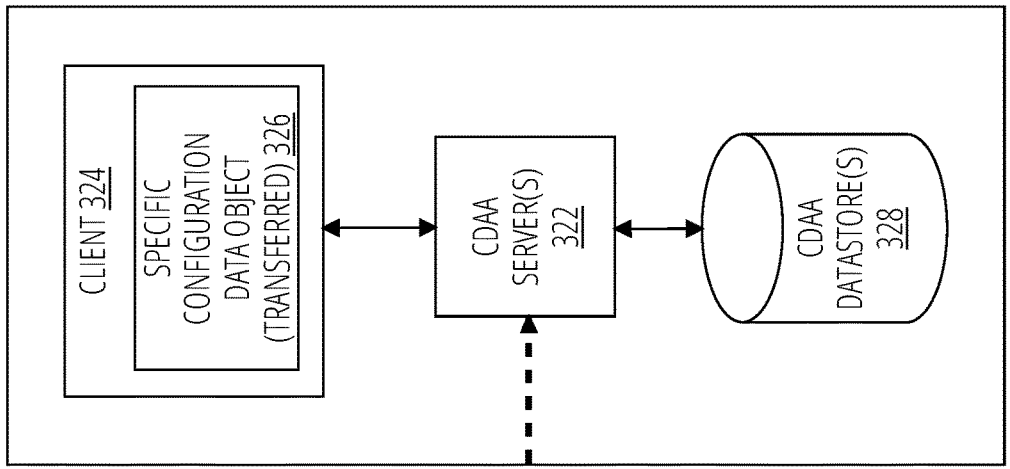
FIG. 3 illustrates a visualization of example sub-systems and an example dataflow between said sub-systems in accordance with at least some embodiments of the present disclosure.
Figure 3:
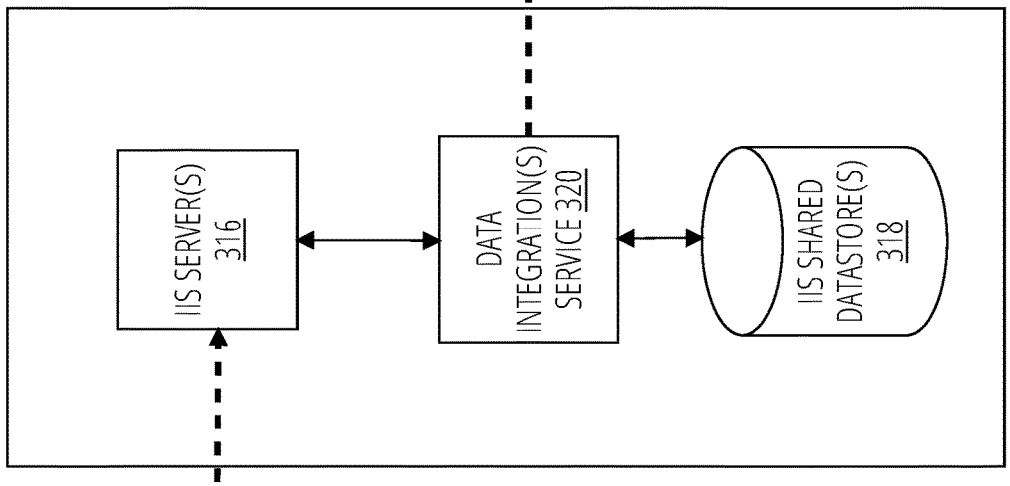
Figure 3:
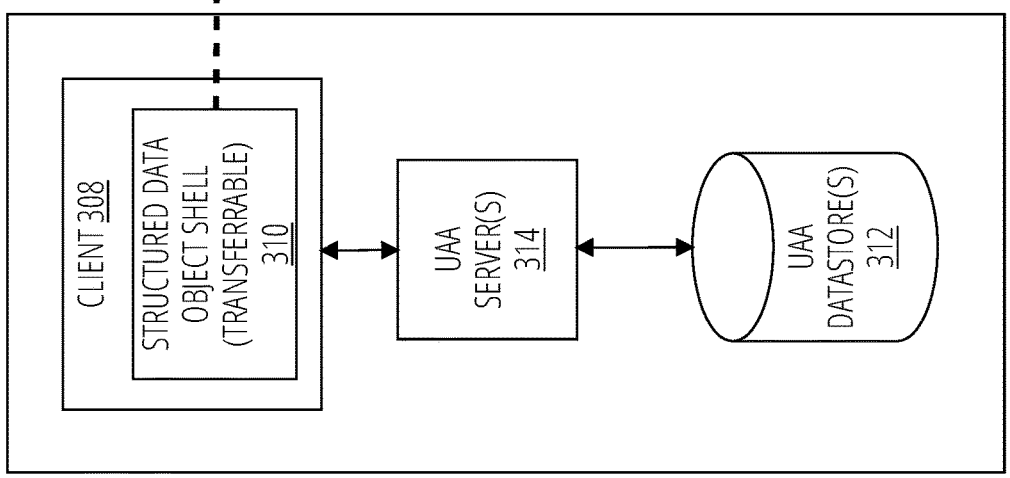

FIG. 3 illustrates a visualization of example sub-systems and an example dataflow between said sub-systems in accordance with at least some embodiments of the present disclosure. Specifically, FIG. 3 depicts data interactions between sub-systems that facilitate execution of particular operation(s) associated with different applications. It will be appreciated that the sub-systems described may each maintain an independent data environment, and may transmit data between the sub-systems to facilitate particular data flow(s) and/or operation(s).

FIG. 3 depicts sub-systems including a user-accessed application system 302, intermediary integration system 304, and converted data access application system 306. In some embodiments, the sub-systems 302, 304, and 306 communicate via one or more communication networks, as described herein.

The user-accessed application system 302 is associated with maintaining and/or providing access to a user-accessed application. In some embodiments, the user-accessed application system 302 includes a client 308. The client 308 enables end-user access to the user-accessed application. For example, in some embodiments, the client 308 includes a client device owned and/or otherwise operated by a particular user. In some such embodiments, the client device accesses or executes a user-facing application enabling access to the user-accessed application. In some embodiments, the user-accessed application includes functionality performed by the user-facing application alone or in conjunction with one or more corresponding backend applications, for example executed via the user-accessed application server(s) 314.

The user-accessed application server(s) 314 includes one or more computing device(s) embodied in hardware, software, firmware, and/or a combination thereof, that execute at least a portion of a user-accessed application. In some embodiments, the user-accessed application server(s) 314 execute a backend application of the user-facing application, for example that performs operation(s) initiated by a client 308. The user-accessed application server(s) 314 in some embodiments receives operation request(s) from the client 308, for example via the user-facing application corresponding to the user-accessed application server(s) 314. The user-accessed application server(s) 314 may identify, generate, retrieve, and/or return data to the client 308 in response to the operation request(s). In some embodiments, the user-accessed application server(s) 314 include one or more specially configured application server(s) that enable a particular service, portion of functionality, operation, and/or the like performable via the user-accessed application. It will be appreciated that any number of interconnected application server(s) may be communicable with one another to provide a particular service, portion of functionality, operation, and/or the like, including locally connected application server(s) and/or cloud application server(s) communicable over a network.

The user-accessed application datastore(s) 312 includes one or more data repositories embodied in hardware, software, firmware, and/or a combination thereof, that stores and/or otherwise maintains data utilized by the user-accessed application. In some embodiments, the user-accessed application datastore(s) 312 stores structured data object shell(s) generated via the user-accessed application and/or otherwise utilized by the user-accessed application. The user-accessed application server(s) 314 may communicate with the user-accessed application datastore(s) 312 to utilize the user-accessed application datastore(s) 312 to store and/or retrieve data utilized by the user-accessed application. In some embodiments, the user-accessed application datastore(s) 312 include one or more specially configured database server(s) that enable particular storage and/or retrieval of data. It will be appreciated that any number of interconnected database server(s) may be communicable with one another to provide data storage and/or data retrieval access.

The intermediary integration system 304 is associated with maintaining and/or providing access to data graduation process(es). In some embodiments, the intermediary integration system 304 includes an intermediate integration system server(s) 316. In some embodiments, the intermediate integration system server(s) 316 includes one or more computing device(s) embodied in hardware, software, firmware, and/or a combination thereof, that execute at least one software application that provides access to one or more operations for that generate and/or utilize structured data object shell(s). The intermediate integration system server(s) 316 may support any such integrated operations associated with any such functionality that the user-accessed application provides. In some embodiments, the intermediate integration system server(s) 316 generates, stores, and/or otherwise maintains the structured data object shell(s) utilized as part of operation(s) initiated via the user-accessed application system 302. In some embodiments, the intermediary integration system server(s) 316 include one or more specially configured application server(s) that enable a particular integrated service, portion of integrated functionality, integrated operation, and/or the like performable via the user-accessed application, and that generates data that may subsequently be graduated via data graduation process(es). It will be appreciated that any number of interconnected application server(s) may be communicable with one another to provide a particular integrated service, portion of integrated functionality, integrated operation, and/or the like, including locally connected application server(s) and/or cloud application server(s) communicable over a network.

In some embodiments, the data integration(s) service 320 includes one or more computing device(s) embodied in hardware, software, firmware, and/or a combination thereof, that executes at least one software application that enables access to one or more data graduation process(es). In some embodiments, the data integration(s) service 320 includes one or more backend system(s) that identify and/or retrieve structured data object shell(s) associated with a particular user, user account, and/or the like, corresponding to a particular user-accessed application. Additionally or alternatively, in some embodiments, the data integration(s) service 320 is configured to perform one or more data graduation process(es), for example by executing a data conversion algorithm to convert one or more identified structured data object shell(s) to corresponding specific configuration data object(s). In some embodiments, the data integration(s) service 320 include one or more specially configured application server(s) that enable such data graduation process(es). It will be appreciated that any number of interconnected application server(s) may be communicable with one another to provide such data graduation process(es), including locally connected application server(s) and/or cloud application server(s) communicable over a network.

In some embodiments, the intermediary integration system 304 executes a backend application that is interactable via a user-facing application associated with a user-accessed application. For example, a sub-view or sub-application embedded within a corresponding user-facing application for a user-accessed application may facilitate particular integrated operations via communication with the intermediary integration system 304. In some embodiments, the intermediate integration system server(s) 316 performs operation(s) initiated by a client 308 associated with the user-accessed application system 302. For example, in some embodiments the user-accessed application system 302 communicates—for example via the client 308 and/or user-accessed application server(s) 314—with the intermediary integration system 304 to enable maintenance and/or storing of the structured data object shell 310 via the intermediary integration system 304. Additionally or alternatively, the intermediate integration system server(s) 316 may execute one or more operation(s) that perform a data conversion algorithm for generating specific configuration data object(s) from the structured data object shell(s) accessible to the intermediary integration system 304. In some embodiments, the intermediary integration system 304 receives operation request(s) transmitted via the user-accessed application system 302, for example in response to user engagement requesting initiating of an operation associated with a converted data access application system 306, and/or integrated operations performable via the data integration(s) service 320.

The intermediary integration system shared datastore(s) 318 includes one or more data repositories embodied in hardware, software, firmware, and/or a combination thereof, that stores and/or otherwise maintains data for conversion via the data graduation process(es) as described. In some embodiments, the intermediary integration system shared datastore(s) 318 stores structured data object shell(s) generated via the user-accessed application in communication with the intermediary integration system 304 and/or otherwise utilized by the user-accessed application. The intermediary integration system shared datastore(s) 318 in some embodiments is shared with the user-accessed application system 302, such that the user-accessed application system 302 is communicable with the intermediate integration system server(s) 316 and/or intermediary integration system shared datastore(s) 318 to store data to and/or retrieve data from the data integration(s) service 320. In some embodiments, the intermediary integration system shared datastore(s) 318 include one or more specially configured database server(s) that enable particular storage and/or retrieval of data utilized by the intermediary integration system 304. It will be appreciated that any number of interconnected database server(s) may be communicable with one another to provide data storage and/or data retrieval access.

In some embodiments, the intermediary integration system 304 is communicable with the converted data access application system 306. For example, as illustrated, in some embodiments the data integration(s) service 320 is authorized or otherwise configured to enable transmission of data to the converted data access application system 306. In some embodiments, the data integration(s) service 320 communicates with the converted data access application system 306 to store specific configuration data object(s) generated from converting structured data object shell(s) via a data graduation process. In this regard, the intermediary integration system 304 may perform the data graduation by applying a structured data object shell to a conversion algorithm that generates a specific configuration data object corresponding thereto based at least in part on data value(s) of the structured data object shell and one or more additional data value(s) associated with the converted data access application system 306, a user account associated therewith, and/or the like. In some embodiments, the data integration(s) service 320 communicates with the converted data access application system 306 via one or more APIs made available to the intermediary integration system 304. In some embodiments, such APIs are accessible to identify information utilized in converting a structured data object shell, setting one or more data properties of a corresponding specific configuration data object, and/or the like.

The client 324 is associated with maintaining and/or providing access to a converted data access application. In some embodiments, the converted data access application system 306 includes a converted data access application server(s) 322 that maintains the converted data access application. The client 324 enables end-user access to the converted data access application. For example, in some embodiments, the client 324 includes a client device owned and/or otherwise operated by a particular user. In some such embodiments, the client device accesses or executes a user-facing application enabling access to the converted data access application server(s) 322. In some embodiments, the converted data access application includes functionality performed by the user-facing application alone or in conjunction with one or more corresponding backend applications, for example executed via the converted data access application server(s) 322.

The converted data access application server(s) 322 includes one or more computing device(s) embodied in hardware, software, firmware, and/or a combination thereof, that execute at least a converted data access application. In some embodiments, the converted data access application server(s) 322 execute a backend application of the converted data access application, for example that performs operation(s) initiated via the client 324. The converted data access application server(s) 322 in some embodiments receives operation request(s) from the client 324, for example via the user-facing application corresponding to the converted data access application server(s) 322. The converted data access application server(s) 322 may identify, generate, retrieve, and/or return data to the client 324 in response to the operation request(s). In some embodiments, the operation request(s) are received by the converted data access application server(s) 322 and the converted data access application server(s) 322 generates and/or utilizes specific configuration data object(s), such as the specific configuration data object 326, to perform such operation(s).

The converted data access application datastore(s) 328 includes one or more data repositories embodied in hardware, software, firmware, and/or a combination thereof, that stores and/or otherwise maintains data utilized by the converted data access application. In some embodiments, the converted data access application datastore(s) 328 stores specific configuration data object(s) generated via the converted data access application and/or otherwise utilized by the converted data access application. The converted data access application datastore(s) 328 may be accessed to store the specific configuration data object(s) converted via the intermediary integration system 304. For example, in some embodiments the intermediary integration system 304 via the data integration(s) service 320 communicates with the converted data access application system 306 via the converted data access application server(s) 322 to push converted specific configuration data object(s), such as the specific configuration data object 326 to the converted data access application datastore(s) 328.

In some embodiments, the intermediary integration system embodies a hardware system separate from converted data access application system 306 that facilitates access to integrated operations representing a particular subset of operations (e.g., a "lite" version) accessible via the converted data access application for integration via one or more other application(s), such as the user-accessed application. In this regard, the intermediary integration system 304 may include the particular hardware that executes the integrated operations separate from the hardware of the converted data access application system 306. In some embodiments, access to the intermediary integration system 304 differs from access to the converted data access application system 306. For example, the permissions and/or other access credentials utilized by another application system to access the intermediary integration system 304 may be less restrictive than the permissions and/or other access credentials utilized to access the converted data access application system 306.

In some embodiments, the user-facing application associated with the user-accessed application system 302 is configured to provide access to the integrated operations facilitated via the intermediary integration system 304 before data graduation occurs (e.g., by default). Upon performance of the data graduation process(es) as described herein, the same user-facing application associated with the user-accessed application system 302 is configured to provide access to a complete suite of operations facilitated via the converted data access application system 306. In this regard, in one example context, a user may access a first sub-interface or view within the user-facing application associated with the user-accessed application system 302 to utilize the integrated operations facilitated via the intermediary integration system 304 that generates and/or stores structured data object shell(s) to the intermediary integration system 304. The functionality representing the integrated operations of the intermediary integration system 304 may be embedded within this sub-interface or view to enable execution of the integrated operations. In some such embodiments, subsequent to completion of the data graduation process(es), a second sub-interface or view within the user-facing application associated with the user-accessed application system 302 may become accessible. This second sub-interface or view may replace the previous first sub-interface or view and provide access to a complete operational package provided via the converted data access application system 306 rather than the subset of operations provided via the intermediary integration system 304. Such a second sub-interface may embed access to the functionality representing the complete operational package facilitated via the converted data access application system 306 within the same user-facing application associated with the user-accessed application system 302. In this regard, the user may gain access to the complete set of operations made available via the converted data access application system 306 as an embedded application upon completion of data graduation without indicating to the user that the underlying hardware, software, and/or firmware systems supporting such operations has changed. The user may thereafter continue to utilize the embedded complete operations facilitated via the converted data access application system 306 post-data graduation.

Figure 4:
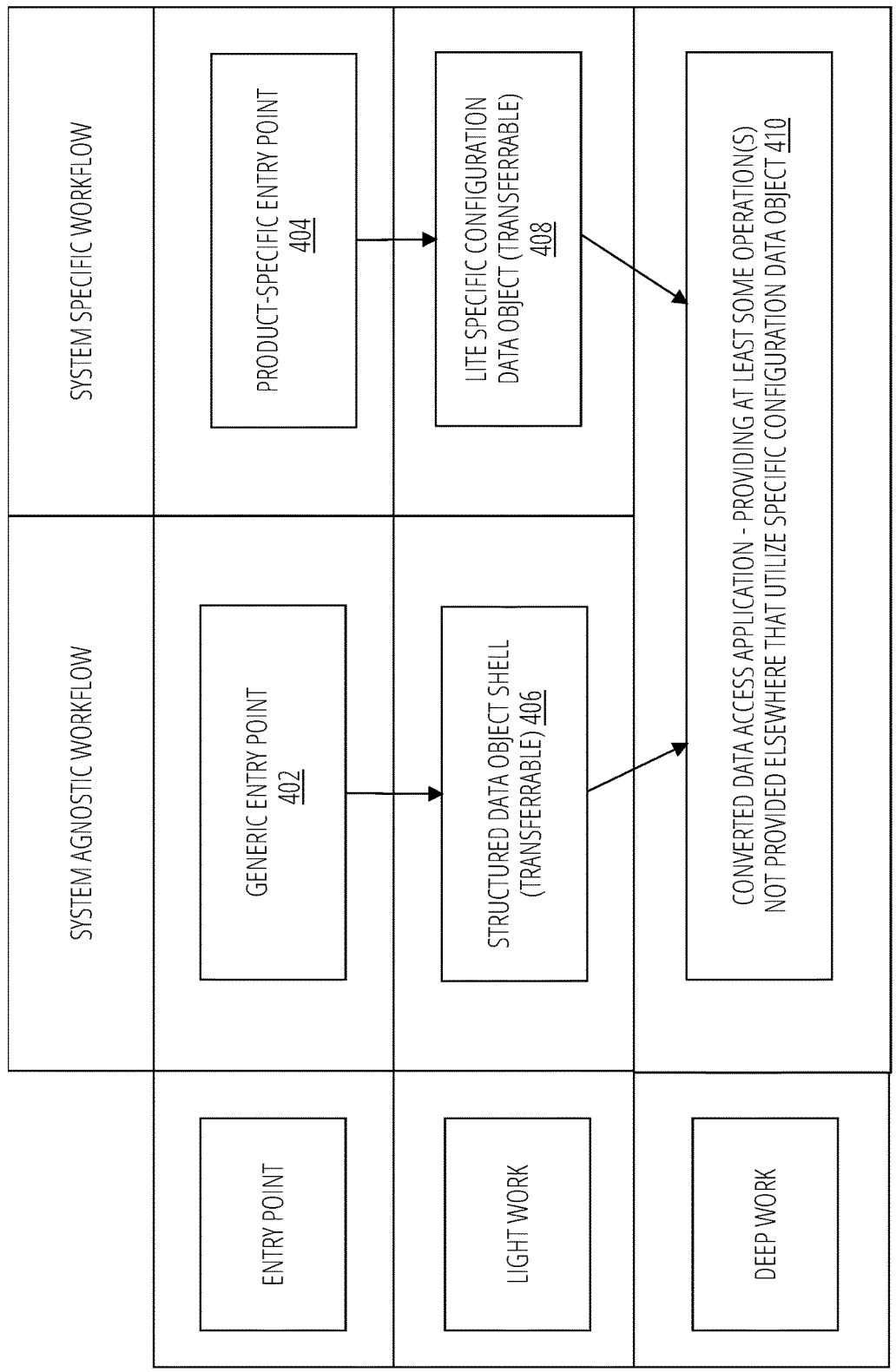
FIG. 4 illustrates an example data architecture for data graduation in accordance with at least some example embodiments of the present disclosure.

FIG. 4 illustrates an example data architecture for data graduation in accordance with at least some example embodiments of the present disclosure. Specifically, FIG. 4 depicts an example different workflows utilized by applications to provide different operations in accordance with a different data architecture. The workflows and corresponding data architectures depicted and described in FIG. 4 may differentiate between different types of integrations that may be facilitated by an intermediary integration system, for example between a user-accessed application and a converted data access application.

For example, in some embodiments, an intermediary integration system facilitates integration of a product-agnostic workflow to a user-accessed application. In some such embodiments, the user may enter the product-agnostic workflow via a generic entry point 402, for example a button or other user interface component provided natively within a user-accessed application. The generic entry point 402 utilized to initiate the particular workflow may not be identified or otherwise indicated as associated with any particular converted data access application. In one example context, a user-accessed application that includes a button for creating a new generic chart data object utilizes the button as a generic entry point 402.

The generic entry point 402 may be utilized to generate a particular data object that enables performance of light work. Specifically, as illustrated, the generic entry point 402 may be utilized to generate a structured data object shell 406 via the user-accessed application. The structured data object shell 406 may be associated with one or more operations accessible via the user-accessed application. Such operations may be limited as compared to operations provided via a corresponding converted data access application, as described further herein, but enables an expansion of the functionality provided via the user-accessed application. A non-limiting example of a structured data object shell 406 generated via a generic entry point 402 includes a generic board data object generated via a user-accessed application.

In a circumstance where deep work is required—for example operations that are more robust and/or specific than the operations available using the structured data object shell 406—a user may then access the converted data access application 410. In this regard, the converted data access application 410 may be specially configured in a manner that provides at least some operations that are not provided as part of the user-accessed application integrated with an intermediary integration system alone, and that specifically utilize a particular configuration of data object, for example a specific configuration data object of a particular object data schema. Advantageously, to avoid problems with data loss, the structured data object shell 406 may be converted to a specific configuration data object for use with the converted data access application 410 via data graduation as described herein. In this regard, the described product-agnostic workflow functions in an advantageous manner that enables subsequent access and/or integration between the user-accessed application and converted data access application that provides a seamless user experience as needed.

Alternatively or additionally, in some embodiments, an intermediary integration system facilitates integration of a product-specific workflow via a user-accessed application. In some such embodiments, the user may enter the product-specific workflow via a product-specific entry point 404, for example a button or other user interface component that links to indicates access of functionality powered by a particular second application (e.g., a converted data access application) that is distinct from the user-accessed application. The product-specific entry point 404 utilized to initiate the particular workflow may specifically identify the converted data access application providing such operations via integration, for example a button to "import from [the converted data access application]" in some contexts. In one example context, a user-facing application for a user-accessed application includes a button for creating a new, lite version of a specific configuration data object utilizes the button as a product-specific entry point 404 by configuring the button to enable creation of a new chart data object via a different application such as Google Sheets.

The product-specific entry point 404 may be utilized to generate a particular data object that enables performance of light work. Specifically, as illustrated, the product-specific entry point 404 may be utilized to generate a lite version of a specific configuration data object, for example where the lite version of the specific configuration data object or a portion thereof is accessible as lite specific configuration data object 408 within a user-facing application associated with a user-accessed application. In this regard, the lite specific configuration data object 408 may be associated with particular operations that are performable via the user-facing application associated with the user-accessed application. Additionally, the lite specific configuration data object 408 may be configured via an object data schema that is consistent with an object data schema for a specific configuration data object utilized by a corresponding converted data access application.

In a circumstance where deep work is required—for example operations that are more robust and/or specific than the operations available using the lite specific configuration data object 408—a user may then access the converted data access application 410 in the product-specific data flow as well. In this regard, it is desirable that in either workflow the data generated from user interaction with the user-facing application associated with the user-accessed application is transferrable to the corresponding converted data access application 410 in a circumstance where additional operations are required. In this regard, to advantageously provide a seamless integration in either such circumstance, an intermediary integration system may be configured as described herein that performs a data graduation of data utilized by a user-facing application for a user-accessed application for use by a converted data access application. As such, the structured data object shell 406 and/or lite specific configuration data object 408 (e.g., embodying a specific type of structured data object shell) may be processed via the intermediary integration system to generate a corresponding specific configuration data object usable via the converted data access application 410 for deeper work by accessing one or more additional operations associated with the specific configuration data object in particular.

In this regard, it will be appreciated that the structured data object shell 406 and the lite specific configuration data object 408 are transferrable or otherwise convertible to specific configuration data object(s) via data graduation. The structured data object shell 406 may embody generic data values structured in accordance with a particular object data schema that is not tied to any particular application, whereas the lite specific configuration data object 408 may embody data values structured in accordance with a particular object data schema that is a reduced or minimized version of another object data schema for specific configuration data object(s) accessible via the converted data access application. In one example context, the lite specific configuration data object 408 embodies a portable version of a specific configuration chart data object utilized by Google Sheets to organize chart data, and that is importable via an integration (e.g., supported via the intermediary integration system) with Google Sheets. Alternatively in some embodiments the structured data object shell 406 embodies any data structure(s) that organize data values into a particular chart. A particular intermediary integration system may support a data graduation for structured data object shell(s) embodying a lite specific configuration data object, structured data object shell(s) embodying a generic data arrangement, or a combination thereof (e.g., in a circumstance where the intermediary integration system supports both product-agnostic and product-specific integrations associated with data that is converted, via the data graduation, to specific configuration data object for use with a particular converted data access application).

Figure 5:
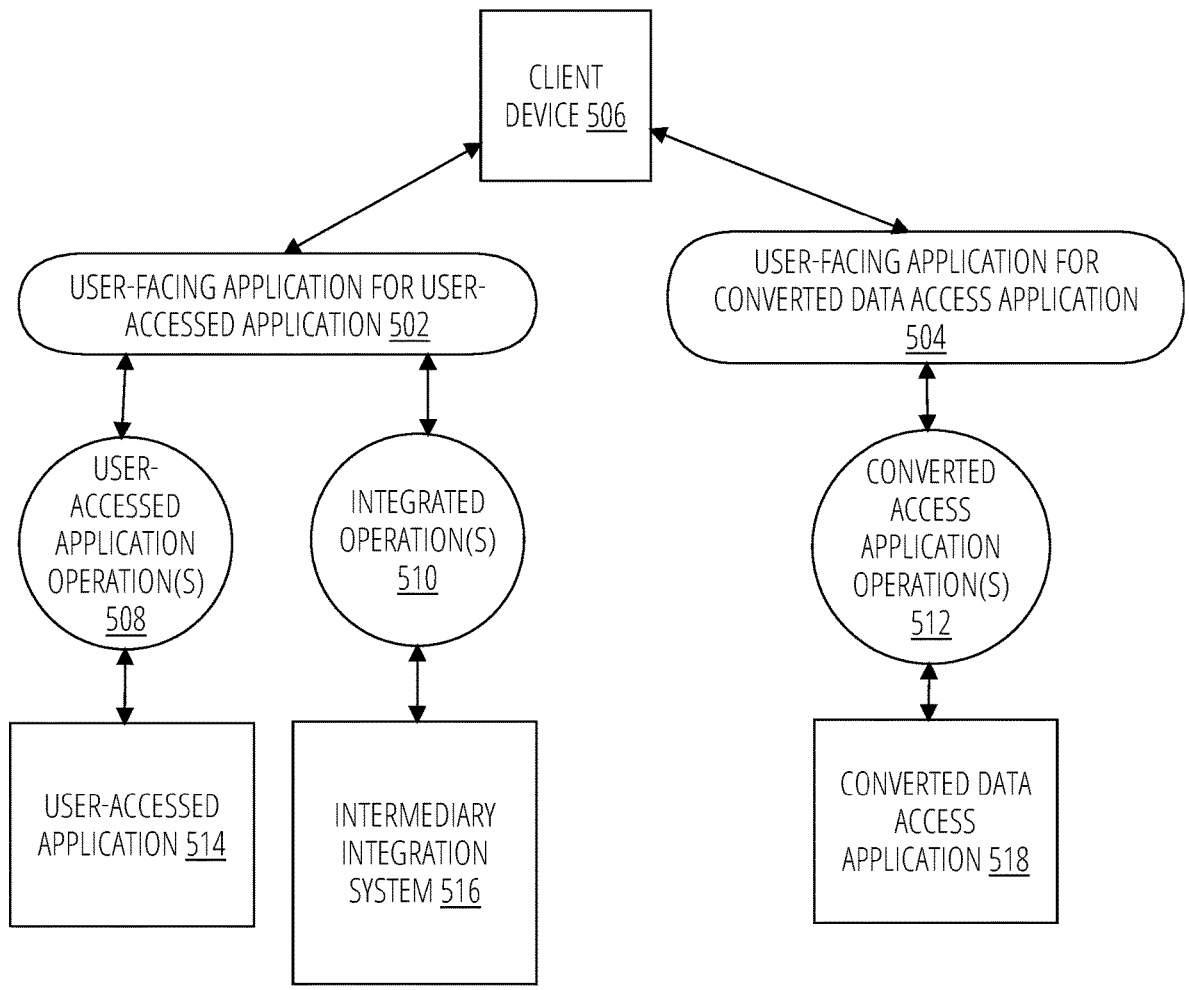
FIG. 5 illustrates a visualization of an example data operations for data graduation in accordance with at least some embodiments of the present disclosure.

FIG. 5 illustrates a visualization of an example data operations for data graduation in accordance with at least some embodiments of the present disclosure. Specifically, FIG. 5 illustrates example data operations processable via different applications of a client device. FIG. 5 depicts an example client device 506 that is configured to execute at least one user-facing application, for example a user-facing application for user-accessed application 502 and/or a user-facing application for converted data access application 504. In some embodiments, the user-facing application for user-accessed application 502 is the only user-facing application accessible via the client device 506 until after data graduation is initiated associated with a corresponding converted data access application. In this regard, the user may utilize the user-facing application for user-accessed application 502 to access integrated operations associated with data graduation to a corresponding converted data access application for any amount of time, for example until more robust operation(s) provided by the converted data access application is/are desired by the user.

The user-facing application for user-accessed application 502 may be utilized for any number of operations. In some embodiments, the user may interact with the user-facing application for user-accessed application 502 to initiate and/or request user-accessed application operation(s) 508. The user-accessed application operation(s) 508 may be performable entirely via the user-accessed application 514. In this regard, the user-accessed application operation(s) 508 may specifically embody native operations available via the user-accessed application 514 without integration. Alternatively or additionally, in some embodiments, such user-accessed application operation(s) 508 includes operations associated with light work performed via the user-accessed application 514, for example that generate and/or utilize a structured data object shell (e.g., generated via the user-accessed application 514).

Additionally or alternatively, the user may interact with the user-facing application for user-accessed application 502 to initiate and/or request integrated operation(s) 510. The integrated operation(s) 510 may be performable via an intermediary integration system, for example embodying a "lite" version of a converted data access application executed on separate hardware from a system that facilitates operations of the full converted data access application 516. In some embodiments, the intermediary integration system is integrated within the user-accessed application to enable the integrated operation(s) 510, for example by being embedded within functionality associated with the user-accessed application 514 as a sub-view within the user-facing application for user-accessed application 502. Such integrations may include operations for generating and/or importing a lite specific configuration data object or a generic data structure not associated with any specific application, for example where the lite specific configuration data object or generic data structure is maintained as a structured data object shell that is convertible and/or otherwise transferrable via a data graduation process. Additionally or alternatively still, in some embodiments, the integrated operation(s) 510 may include a request to perform a data graduation process associated with a particular converted data access application, such as the converted data access application 518.

In some embodiments, the integrated operation(s) 510 are provided utilizing one or more operation(s) made available via the user-facing application associated with the user-accessed application, and facilitated at least in part by the intermediary integration system. For example, such integrated operation(s) 510 may embody integration in the user-accessed application and operations associated with a converted data access application. Such integrations may embody particular functionality that generates structured data object shell(s) utilized for first operations performed via the user-accessed application. In one example context, the integration embodies a product-agnostic integration that generates and/or utilizes structured data object shell(s). The product-agnostic integration may include integrated operation(s) that enables basic functionality associated with high-level data types, such as a chart, a list, a task, a calendar, and/or the like. The structured data object shell(s) associated with such integrated operation(s) may be structured in accordance with a particular object data schema, but for example not embodied in a manner specific to any particular proprietary application.

In other embodiments, the integration embodies a product-specific integration. In some such embodiments, such integrations may embody particular functionality that generates and/or utilizes a structured data object shell embodying a lite specific configuration data object. The lite specific configuration data object may embody a data object structured in accordance with at least a portion of an object data schema corresponding to the associated specific configuration data object utilized by the converted data access application. In some embodiments, the lite specific configuration data object is associated with a reduced operations package that may be performed associated with the data object. For example, in some embodiments, a specific configuration data object associated with a converted data access application is associated with an operations package including all operations of a CRUD operations package, whereas a lite specific configuration data object in some embodiments is associated with an operations package including only a subset of operations of a CRUD operations package (e.g., read and delete, for example). It will be appreciated that the data attribute differences and/or operation differences between a specific configuration data object and a corresponding lite specific configuration data object may be specifically designed such that particularly important operation(s) are only performable associated with the specific configuration data object and not the corresponding lite specific configuration data object, for example where the functionality that particularly serves as an application's "secret sauce" remains solely performable using the specific configuration data object via the converted data access application.

In some embodiments, upon performance of a data graduation process, data associated with or otherwise maintained by an intermediary integration system via the user-facing user-accessed application 514 (e.g., structured data object shell(s)) may be processed by the intermediary integration system to generate and/or store corresponding specific configuration data object(s). In this regard, the specific configuration data object(s) may be associated with a particular user account provisioned for a corresponding converted data access application, such that the converted data access application may subsequently be accessed to interact with the specific configuration data object(s) utilizing operations available associated with such specific configuration data object(s) via the converted data access application.

The user-facing application for converted data access application 504 may be utilized for any of a number of operations specific to the corresponding converted data access application 518. In some embodiments, the user may interact with the user-facing application for converted data access application 504 to initiate and/or request converted access application operation(s) 512. The converted access application operation(s) 512 may be performable entirely via the converted data access application 518. In this regard, the converted access application operation(s) 512 may embody robust operations provided natively via the converted data access application 518. The available converted access application operation(s) 512 in some embodiments includes a more robust and/or specific operations package associated with specific configuration data object(s) than a corresponding operations package associated with structured data object shell(s). In some embodiments, for example, the converted access application operation(s) 512 embodies a CRUD operations package for a particular specific configuration data object that enables more CRUD operations than a corresponding CRUD operations package for a particular structured data object shell. In this regard, upon data graduation, a user may gain access to additional and/or alternative, more robust operations via the converted data access application 518 using corresponding specific configuration data object.

In some embodiments, the intermediary integration system supports integrated operation(s) 510 together with the user-accessed application 514 in a manner that maintains a particular look and feel. For example, regardless of whether the intermediary integration system supports operation(s) for generating structured data object shell(s) via a product-agnostic or a product-specific workflow, the user-facing application for user-accessed application 502 may be specially configured in a manner such that a look-and-feel of user interface elements associated with the integrated operation(s) 510 matches a native look-and-feel of user interface elements associated with the user-accessed application operation(s) 508 provided without integration. In this regard, for example, the user-facing application for user-accessed application 502 may be specially configured to enable generation of a structured data object shell via interaction with a first interface that is rendered associated with the native look-and-feel. For example, in some embodiments, the intermediary integration system and/or the user-accessed application configures the first interface to include one or more user interface elements for initiating the integrated operation(s) 510 and appear in a same style, color, or with other visual properties of user interface elements native to the user-accessed application. In this regard, the user-facing application for user-accessed application 502 may be accessed to perform integrated operation(s) 510 without indicating to a user that particular functionality is integrated or native to the user-accessed application, thereby enabling an improved user experience. After data graduation occurs, the same look-and-feel may be utilized to embed a full version of the converted data access application into the user-facing application for the user-accessed application, for example such that no significant visual change occurs to the user.

The computer-implemented method of claim 1, wherein the user-accessed application is associated with a user-facing application associated with a native look and feel, and wherein the user-facing application provides a first interface usable to generate the structured data object shell via an operation associated with the intermediary integration system, the first interface rendered based on the native look and feel associated with the user-accessed application.

Example Processes of the Disclosure

Having described example systems and apparatuses, data environments, data flows, and data architectures in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 6:
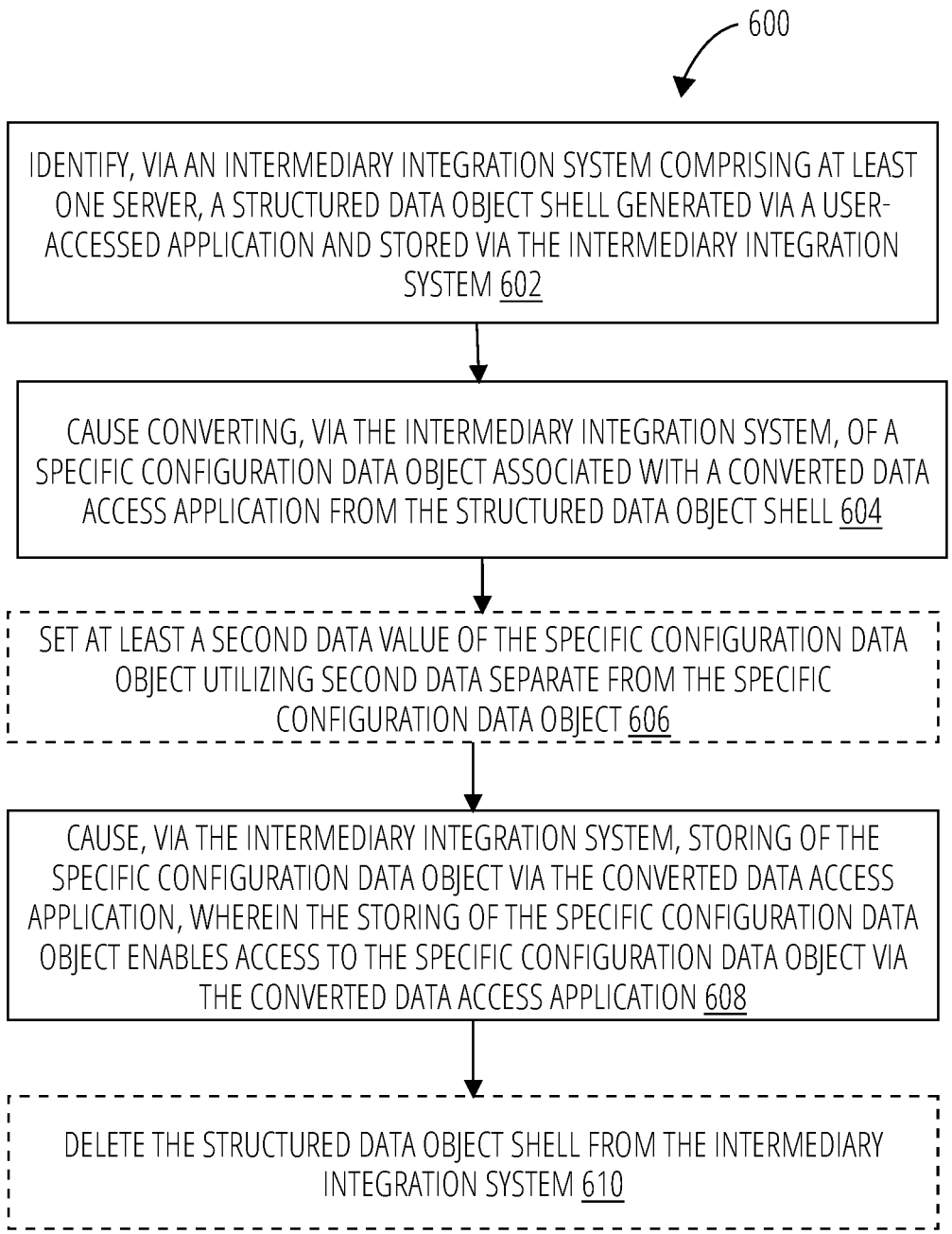
FIG. 6 illustrates a flowchart representing a process 600 for data graduation in accordance with at least some embodiments of the present disclosure.

FIG. 6 illustrates a flowchart representing a process 600 for data graduation in accordance with at least some embodiments of the present disclosure. Specifically, FIG. 6 depicts operations of an example process 600. In some embodiments, the process 600 is embodied by computer program code stored on a non-transitory computer-readable storage medium of a computer program product configured for execution to perform the process as depicted and described. Alternatively or additionally, in some embodiments, the process 600 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with one or more system(s) embodying a user-accessed application and/or a converted data access application. For purposes of simplifying the description, the process 600 is described as performed by and from the perspective of the apparatus 200.

The process 600 begins at operation 602. At operation 602, the apparatus 200 includes means, such as the integrated operation circuitry 210, data storage circuitry 212, data conversion circuitry 214, communications circuitry 208, input/output circuitry 206, and/or processor 202, or any combination thereof, that identifies, via an intermediary integration system comprising at least one server, a structured data object shell generated via a user-accessed application and stored via the intermediary integration system. In some embodiments, the structured data object shell is retrieved from one or more datastore(s) of the intermediary integration system. The structured data object shell may be generated in response to user interaction with the user-accessed application that requests or initiates integrated operation(s) facilitated at least in part by the intermediary integration system. Alternatively or additionally, in some embodiments the structured data object shell may be generated in response to user interaction with the user-accessed application that requests or initiates native operation(s) facilitated via the user-accessed application, but where the resulting generated structured data object shell is stored by the intermediary integration system for subsequent conversion via a data graduation process as described herein.

At operation 604, the apparatus 200 includes means, such as the integrated operation circuitry 210, data storage circuitry 212, data conversion circuitry 214, communications circuitry 208, input/output circuitry 206, and/or processor 202, or any combination thereof, that causes converting, via the intermediary integration system, of a specific configuration data object associated with a converted data access application from the structured data object shell. In some embodiments, the converting of the structured data object shell to a specific configuration data object facilitates generation of a new specific configuration data object accessible via a corresponding converted data access application. In some embodiments, the converted data access application maintains access to the new specific configuration data object, for example independently from the intermediary integration system.

In some embodiments, the apparatus 200 causes converting of the structured data object shell via the intermediary integration system utilizing a conversion algorithm. In some embodiments, the conversion algorithm maps one or more data attribute(s) of a structured data object shell to a corresponding specific configuration data object. Additionally or alternatively, in some embodiments, the conversion algorithm alters one or more data value(s) for data attribute(s) of the structured data object shell for setting a corresponding data attribute of the specific configuration data object. The conversion algorithm may embody any number of sub-operations that generate at least a portion of the structured data object shell and/or data associated therewith, as described herein.

The specific configuration data object is configured differently than the corresponding structured data object shell from which it is converted. For example, in some embodiments, the specific configuration data object is configured in accordance with a first object data schema, and the structured data object shell is configured in accordance with a second object data schema. In some embodiments, each object data schema defines one or more different data attribute(s) and/or data relationships between said data attributes. In this regard, for example, the structured data object shell may be associated with an object data schema that include one or more data attribute(s) that correspond to other data attribute(s) of an object data schema for the specific configuration data object. The first object data schema associated with the converted data access application in some embodiments includes one or more additional data attributes, for example defining access permissions, data storage properties, and/or other attributes specific to the converted data access application.

Additionally or alternatively, in some embodiments the first object data schema may include or correspond to a first operations package defining one or more operation(s) that may be performed associated with the corresponding data object, for example the specific configuration data object. The first operations package may include member functions associated with the specific configuration data object, and/or external methods that process one or more specific configuration data object(s). In this regard, the converted data access application may be utilized to perform a first operations package that defines a more robust set of functionality than the second operations package associated with the second object data schema corresponding to the structured data object shell.

In some embodiments, causing converting of the structured data object shell to a specific configuration data object includes one or more sub-operations. For example, in some embodiments, causing converting of the structured data object shell to the specific configuration data object includes translating at least one data value of the structured data object shell to at least a first data value of the specific configuration data object. In some embodiments, one or more data attribute(s) of the object data schema associated with the structured data object shell is mapped to corresponding data attribute(s) of the object data schema associated with the specific configuration data object. In this regard, the apparatus 200 may translate each data value for an attribute in the second object data schema for the structured data object shell to a data value for the corresponding mapped attribute in the first object data schema for the specific configuration data object. A data value for a data attribute of the specific configuration data object may be set to the data value translated from the structured data object shell.

At optional operation 606, the apparatus 200 includes means, such as the integrated operation circuitry 210, data storage circuitry 212, data conversion circuitry 214, communications circuitry 208, input/output circuitry 206, and/or processor 202, or any combination thereof, that sets at least a second data value of the specific configuration data object utilizing second data separate from the specific configuration data object. For example, in some embodiments, the apparatus 200 determines, identifies, and/or generates one or more data values utilized for associating the specific configuration data object with a particular user account registered with the converted data access application. Additionally or alternatively, in some embodiments, the apparatus 200 identifies and/or generates data values for data attributes that organize the specific configuration data object within a data hierarchy utilized by the converted data access application to maintain the specific configuration data object (e.g., by defining a one-to-many relationship between a specific configuration data object and a particular workspace, and/or the like). The second data separate from the specific configuration data object may be generated and/or determined based at least in part on identifier information associated with the converted data access application, user identification information associated with the user-accessed application, a user device, and/or a particular user account accessed associated with the user-accessed application and/or converted data access application. In some embodiments, the data is converted based at least in part on metadata indicating a source, or source log, of the service(s), application(s), system(s), and/or the like from which the structured data object shell was transmitted. Additionally or alternatively, in some embodiments, the data is converted based at least in part on metadata indicating a destination service, application, system, and/or the like to which the specific configuration data object is to be propagated or stored. In this regard, such metadata may enable transmission of data between systems and/or services to facilitate the conversion from where the data is stored and/or originates to a particular target destination. Additionally or alternatively, in some embodiments, one or more data values is/are set based at least in part on results received from API calls to the converted data access application. For example, the converted data access application may be queried via one more API calls to identify identifiers utilized to store the specific configuration data object to a particular database, location, associated with a particular user account, and/or the like.

In some embodiments, additional data associated with a structured data object shell is similarly converted for storing via a corresponding specific configuration data object and/or associated with the corresponding specific configuration data object. For example, in some embodiments, data associated with accessing and/or permissioning use of a structured data object shell is converted via the data graduation process for use in configuring access and/or permissions to the corresponding specific configuration data object. In this regard, the intermediary integration system (e.g., embodied by the apparatus 200, for example, in some embodiments) may store such additional configuration data, associated metadata, and/or the like, for conversion in addition to the substantive data of the structured data object shell itself.

At operation 608, the apparatus 200 includes means, such as the integrated operation circuitry 210, data storage circuitry 212, data conversion circuitry 214, communications circuitry 208, input/output circuitry 206, and/or processor 202, or any combination thereof, that causes, via the intermediary integration system, storing of the specific configuration data object via the converted data access application. In some embodiments, the storing of the specific configuration data object enables access to the specific configuration data object via the converted data access application. In some embodiments, the intermediary integration system is configured with direct access to write to one or more datastore utilized by the converted data access application, such that the intermediary integration system may write to the datastore to store the specific configuration data object. In some embodiments, the apparatus 200 transmits data via an API to the converted data access application to cause the converted data access application to store the specific configuration data object to one or more datastore(s) accessible to the converted data access application. Alternatively or additionally still, in some embodiments, the apparatus 200 transmits data that causes the converted data access application to generate the specific configuration data object based at least in part on a structured data object shell, and store said newly generated specific configuration data object in a datastore accessible to the converted data access application.

At optional operation 610, the apparatus 200 includes means, such as the integrated operation circuitry 210, data storage circuitry 212, data conversion circuitry 214, communications circuitry 208, input/output circuitry 206, and/or processor 202, or any combination thereof, that deletes the structured data object shell from the intermediary integration system. In some embodiments, the apparatus 200 deletes or causes deletion of the structured data object shell from a datastore maintained by the intermediary integration system. In some such embodiments, the data may subsequently only be accessible via the converted data access application. In other embodiments, the intermediary integration system retains the structured data object shell upon completion of generating a corresponding specific configuration data object. In some embodiments, the deletion described with respect to operation 610 is performed after one or more verification process(es) that data graduation is completed, for example as described with respect to FIG. 7 herein.

In some embodiments, upon completion of the data graduation process depicted and described with respect to the process 600, the specific configuration data object is accessible directly via the converted data access application. In this regard, a user may access the converted data access application to perform any of a myriad of operation(s) that utilize the specific configuration data object. Alternatively or additionally, in some embodiments, a user-accessed application may be updated to integrate (e.g., by embedding) a view or sub-application that facilitates communication with systems embodying the converted data access application itself, such that the user may access expanded operations via requests to the converted data access application itself rather than via the intermediary integration system. Such operation(s) may include any of a myriad of extended operation(s) not performable via the user-accessed application integrated with the intermediary integration system alone and/or via the corresponding structured data object shell. The converted data access application may provide particular operation(s) that serve as the secret sauce for the application's competitive advantage over other application(s) and/or the integration of the intermediary integration system with the user-accessed application.

Figure 7:
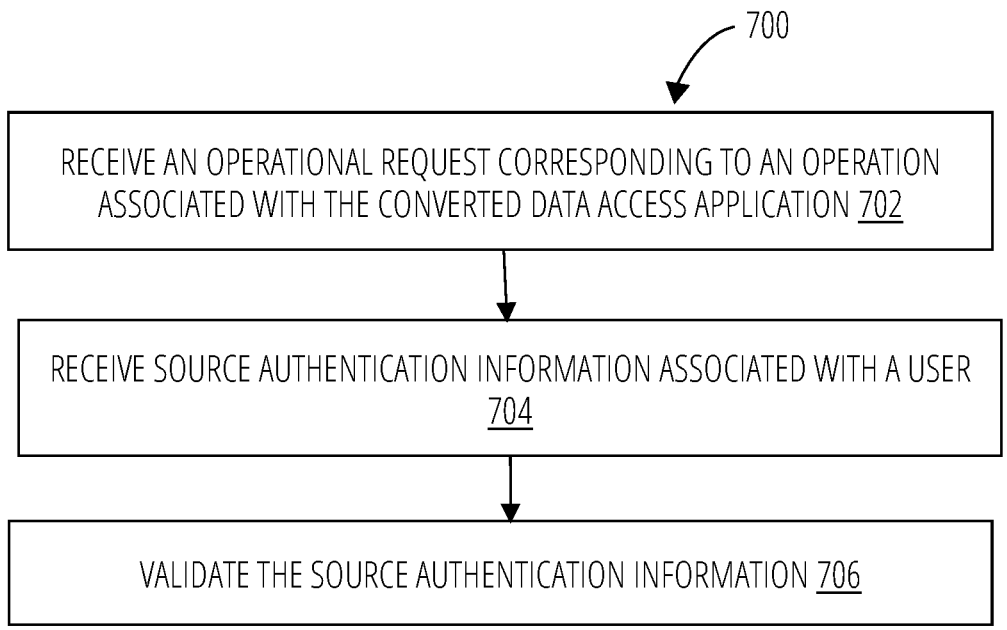
FIG. 7 illustrates a flowchart representing a process 700 for validating an operational request as part of performing data graduation in accordance with at least some embodiments of the present disclosure.

FIG. 7 illustrates a flowchart representing a process 700 for validating an operational request as part of performing data graduation in accordance with at least some embodiments of the present disclosure. Specifically, FIG. 7 depicts operations of an example process 700. In some embodiments, the process 700 is embodied by computer program code stored on a non-transitory computer-readable storage medium of a computer program product configured for execution to perform the process as depicted and described. Alternatively or additionally, in some embodiments, the process 700 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with one or more system(s) embodying a user-accessed application and/or a converted data access application. For purposes of simplifying the description, the process 700 is described as performed by and from the perspective of the apparatus 200.

The process 700 begins at operation 702. In some embodiments, the process 700 begins after one or more operations depicted and/or described with respect to any one of the other processes described herein. For example, in some embodiments as depicted, the process 700 begins before execution of operation 602. In this regard, some or all of the process 700 may replace or supplement one or more blocks depicted and/or described with respect to any of the processes described herein. Upon completion of the process 700, the flow of operations may terminate. Additionally or alternatively, as depicted, upon completion of the process 700 in some embodiments, flow may return to one or more operation(s) of another process, such as the operation 602. It will be appreciated that, in some embodiments, the process 700 embodies a sub-process of one or more other process(es) depicted and/or described herein, for example the process 600.

At operation 702, the apparatus 200 includes means, such as the integrated operation circuitry 210, data storage circuitry 212, data conversion circuitry 214, communications circuitry 208, input/output circuitry 206, and/or processor 202, or any combination thereof, that receives an operational request corresponding to an operation associated with the converted data access application. In some embodiments, the operational request is received via a user-accessed application. For example, in some embodiments the operational request corresponds to integrated operation(s) facilitated at least in part by an intermediary integration system. Additionally or alternatively, for example, in some embodiments the operational request indicates a user request to access additional operation(s) facilitated only via the converted data access application (e.g., and not performable via the user-accessed application).

At operation 704, the apparatus 200 includes means, such as the integrated operation circuitry 210, data storage circuitry 212, data conversion circuitry 214, communications circuitry 208, input/output circuitry 206, and/or processor 202, or any combination thereof, that receives source authentication information associated with a user. In some embodiments, the source authentication information is received together with or as part of the operational request. In some embodiments, the source authentication information includes user identification data and/or user authentication credentials corresponding to a user account registered with the converted data access application. Alternatively or additionally, in some embodiments, the source authentication information includes user identification data and/or user authentication credentials corresponding to a use account registered with the user-accessed application. In this regard, the apparatus 200 may utilize the source authentication information to identify structured data object shell(s) accessible to a particular user of the user-accessed application, and/or identify a target user account of the converted data access application for data objects generated via the data graduation process.

At operation 706, the apparatus 200 includes means, such as the integrated operation circuitry 210, data storage circuitry 212, data conversion circuitry 214, communications circuitry 208, input/output circuitry 206, and/or processor 202, or any combination thereof, that validates the source authentication information. In some embodiments, the apparatus 200 validates the source authentication information via communication with the user-accessed application and/or the converted data access application. For example, in some embodiments, the apparatus 200 including or embodying an intermediary integration system transmits one or more API requests to the user-facing application and/or the converted data access application requesting external validation of the source authentication information, and receives response data indicating whether the source authentication information was successfully validated. In some embodiments, an authenticated session associated with the user-accessed application and/or the converted data access application is initiated upon successful validation of the source authentication information.

Figure 8:
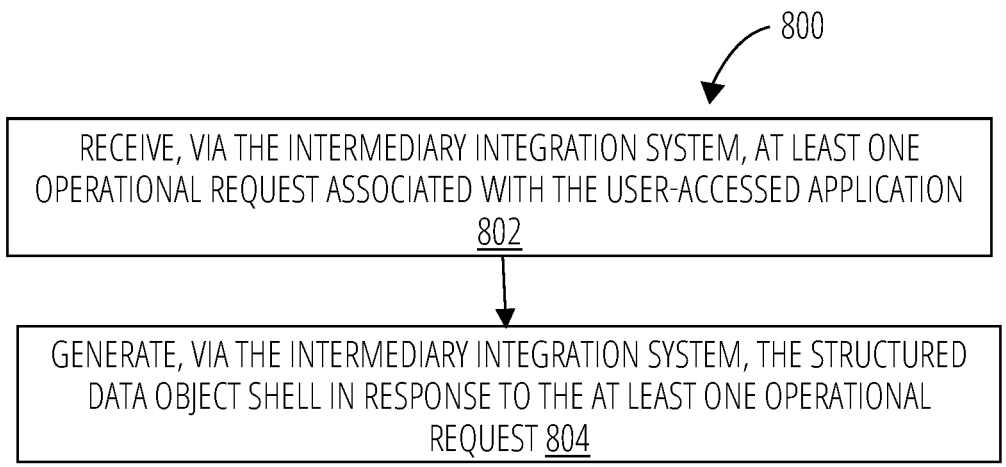
FIG. 8 illustrates a flowchart representing a process 800 for maintaining structured data object shell(s) as part of performing data graduation in accordance with at least some embodiments of the present disclosure.

FIG. 8 illustrates a flowchart representing a process 800 for maintaining structured data object shell(s) as part of performing data graduation in accordance with at least some embodiments of the present disclosure. Specifically, FIG. 8 depicts operations of an example process 800. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with one or more system(s) embodying a user-accessed application and/or a converted data access application. For purposes of simplifying the description, the process 800 is described as performed by and from the perspective of the apparatus 200.

The process 800 begins at operation 802. In some embodiments, the process 800 begins after one or more operations depicted and/or described with respect to any one of the other processes described herein. For example, in some embodiments as depicted, the process 800 begins before execution of operation 602. In this regard, some or all of the process 800 may replace or supplement one or more blocks depicted and/or described with respect to any of the processes described herein. Upon completion of the process 800, the flow of operations may terminate. Additionally or alternatively, as depicted, upon completion of the process 800 in some embodiments, flow may return to one or more operation(s) of another process, such as the operation 602. It will be appreciated that, in some embodiments, the process 800 embodies a sub-process of one or more other process(es) depicted and/or described herein, for example the process 600.

At operation 802, the apparatus 200 includes means, such as the integrated operation circuitry 210, data storage circuitry 212, data conversion circuitry 214, communications circuitry 208, input/output circuitry 206, and/or processor 202, or any combination thereof, that receives, via the intermediary integration system, at least one operational request associated with the user-accessed application. In some embodiments, the apparatus 200 receives the operational request in response to a user interaction with a user-facing application corresponding to the user-accessed application. Alternatively or additionally, in some embodiments, the operational request corresponds to integrated operation(s) facilitated by the user-accessed application at least in part via communication with the intermediary integration system. Such an operational request may in some embodiments be associated with accessing operation(s) that generate and/or utilize structured data object shell(s) convertible to specific configuration data object(s) via data graduation.

At operation 804, the apparatus 200 includes means, such as the integrated operation circuitry 210, data storage circuitry 212, data conversion circuitry 214, communications circuitry 208, input/output circuitry 206, and/or processor 202, or any combination thereof, that generates, via the intermediary integration system, the structured data object shell in response to the at least one operational request. In this regard, the apparatus 200 including or embodying the intermediary integration system may maintain the structured data object shell for subsequent use via the user-facing application. In some embodiments, the intermediary integration system maintains at least one datastore shared with the user-accessed application, such that the user-accessed application may access the structured data object shell(s) stored to the datastore to provide particular operation(s) associated with said structured data object shell(s).

Figure 9:
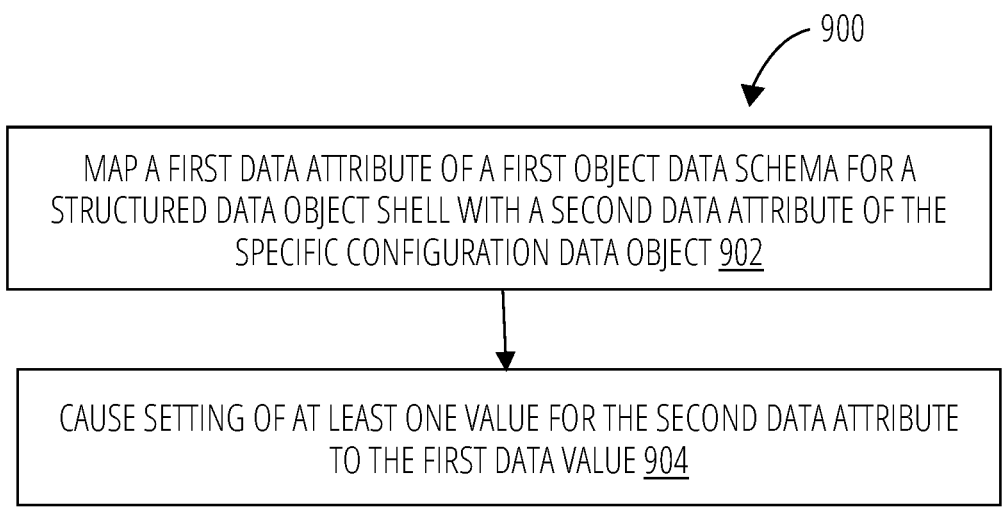
FIG. 9 illustrates a flowchart representing a process 900 for configuring a specific configuration data object as part of performing data graduation in accordance with at least some embodiments of the present disclosure.

FIG. 9 illustrates a flowchart representing a process 900 for configuring a specific configuration data object as part of performing data graduation in accordance with at least some embodiments of the present disclosure. Specifically, FIG. 9 depicts operations of an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with one or more system(s) embodying a user-accessed application and/or a converted data access application. For purposes of simplifying the description, the process 900 is described as performed by and from the perspective of the apparatus 200.

The process 900 begins at operation 902. In some embodiments, the process 900 begins after one or more operations depicted and/or described with respect to any one of the other processes described herein. For example, in some embodiments as depicted, the process 900 begins after execution of operation 602. In this regard, some or all of the process 900 may replace or supplement one or more blocks depicted and/or described with respect to any of the processes described herein, for example operation 604. Upon completion of the process 900, the flow of operations may terminate. Additionally or alternatively, as depicted, upon completion of the process 900 in some embodiments, flow may return to one or more operation(s) of another process, such as the operation 604. It will be appreciated that, in some embodiments, the process 900 embodies a sub-process of one or more other process(es) depicted and/or described herein, for example the process 600.

At operation 902, the apparatus 200 includes means, such as the integrated operation circuitry 210, data storage circuitry 212, data conversion circuitry 214, communications circuitry 208, input/output circuitry 206, and/or processor 202, or any combination thereof, that maps a first data attribute of a first object data schema for a structured data object shell with a second data attribute of the specific configuration data object. In some embodiments, the intermediary integration system is configured to utilize a predetermined mapping between data attributes of the first data object data schema and data attributes of the second object data schema. In some such embodiments, at least a portion of the mapping between the first object data schema and the second object data schema is defined based at least in part on a user-defined mapping utilized to configure the intermediary integration system. Additionally or alternatively, in some embodiments, the apparatus 200 automatically maps one or more data attributes of the first object data schema to data attributes of the second object data schema.

Figure 10:
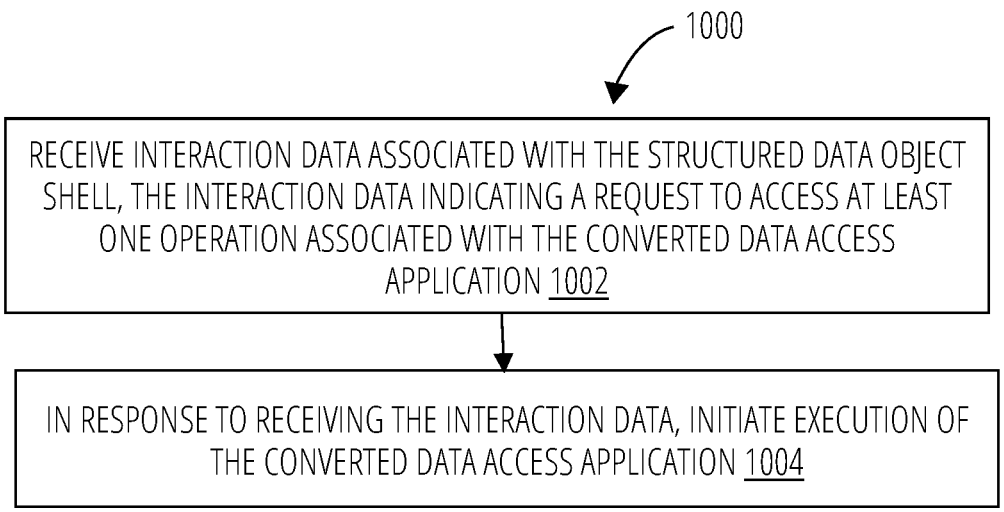
FIG. 10 illustrates a flowchart representing a process 1000 for initiating a user-accessed application as part of performing data graduation in accordance with at least some embodiments of the present disclosure.

At operation 904, the apparatus 200 includes means, such as the integrated operation circuitry 210, data storage circuitry 212, data conversion circuitry 214, communications circuitry 208, input/output circuitry 206, and/or processor 202, or any combination thereof, that causes setting of at least one value for the second data attribute to the first data value. In some embodiments, the intermediary integration system generates a specific configuration data object, such that the intermediary integration system sets the data attributes of the newly generated specific configuration data object directly to the data values of the corresponding mapped data attributes from the structured data object shell. Alternatively or additionally, in some embodiments, the intermediary integration system pushes data to the converted data access application that causes the converted data access application to generate the specific configuration data object having data values set based on the mapping between the data attributes of the structured data object shell and the specific configuration data object FIG. 10 illustrates a flowchart representing a process 1000 for initiating a user-accessed application as part of performing data graduation in accordance with at least some embodiments of the present disclosure. Specifically, FIG. 10 depicts operations of an example process 1000. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with one or more system(s) embodying a user-accessed application and/or a converted data access application. For purposes of simplifying the description, the process 1000 is described as performed by and from the perspective of the apparatus 200.

The process 1000 begins at operation 1002. In some embodiments, the process 1000 begins after one or more operations depicted and/or described with respect to any one of the other processes described herein. For example, in some embodiments as depicted, the process 1000 begins after execution of operation 610. In this regard, some or all of the process 1000 may replace or supplement one or more blocks depicted and/or described with respect to any of the processes described herein. Upon completion of the process 1000, the flow of operations may terminate. Additionally or alternatively, as depicted, upon completion of the process 1000 in some embodiments, flow may return to one or more operation(s) of another process. It will be appreciated that, in some embodiments, the process 1000 embodies a sub-process of one or more other process(es) depicted and/or described herein, for example the process 600.

At operation 1002, the apparatus 200 includes means, such as the integrated operation circuitry 210, data storage circuitry 212, data conversion circuitry 214, communications circuitry 208, input/output circuitry 206, and/or processor 202, or any combination thereof, that receives interaction data associated with the structured data object shell, the interaction data indicating a request to access at least one operation associated with the converted data access application. In some embodiments, the interaction data is received via user engagement with a particular user interface component of a user-facing application associated with the user-accessed application. The user interface component may indicate an operation performable via access to the converted data access application and that is not performable via the user-accessed application. In some embodiments, the particular request to access at least one operation is associated with a particular operation that relies on the configuration of the specific configuration data object.

At operation 1004, the apparatus 200 includes means, such as the integrated operation circuitry 210, data storage circuitry 212, data conversion circuitry 214, communications circuitry 208, input/output circuitry 206, and/or processor 202, or any combination thereof, that in response to receiving the interaction data, initiates execution of the converted data access application. In some embodiments, the apparatus 200 initiates execution of a user-facing application corresponding to the converted data access application, for example by launching the user-facing application corresponding to the converted data access application on a client device previously utilized to submit the request. Additionally or alternatively, in some embodiments, the apparatus 200 initiates download and/or installation of a user-facing application associated with the converted data access application to the client device. Additionally or alternatively still, in some embodiments, the apparatus 200 initiates an authenticated session between the particular client device and the converted data access application.

Conclusion

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer-implemented method comprising:
   receiving, over a network from a first computing device running a user-facing application, a request from a user via the user-facing application and through a user-accessed application for access to one or more operations of a converted data access application, wherein the converted data access application has functionality that is not available in the user-accessed application;

identifying, via an intermediary integration system comprising at least one server and in response to the request from the user, a structured data object shell generated via the user-accessed application and stored via the intermediary integration system;

causing converting, via the intermediary integration system, of a specific configuration data object associated with the converted data access application from the structured data object shell, wherein the specific configuration data object comprises a first format accessible by the converted data access application, wherein the structured data object shell comprises a second format accessible by the user-accessed application, and wherein the converting comprises causing at least:

translating at least one value of the structured data object shell to at least a first data value of the specific configuration data object; and setting at least a second data value of the specific configuration data object utilizing second data separate from the specific configuration data object;

transmitting, over the network and to the converted data access application, the specific configuration data object to enable for the converted data access application to provide access for the user-facing application to access the converted data access application; and causing, via the intermediary integration system, storing of the specific configuration data object via the converted data access application, wherein the storing of the specific configuration data object enables access to the specific configuration data object via the converted data access application.

2. The computer-implemented method of claim 1, the computer-implemented method further comprising:

receiving an operational request corresponding to at least one operation associated with the converted data access application;

receiving source authentication information associated with a user; and validating the source authentication information, wherein the structured data object shell is converted to the specific configuration data object based at least in part on the source authentication information associated with the user, and wherein the structured data object shell is generated before validation of the source authentication information.

3. The computer-implemented method of claim 1, wherein the second data value of the specific configuration data object is associated with a higher-level source attribute or a permissions attribute.

4. The computer-implemented method of claim 1, wherein the structured data object shell is associated with a first object data schema and wherein the specific configuration data object is associated with a second object data schema, and wherein translating the at least one value of the structured data object shell to at least the first data value of the specific configuration data object comprises:

mapping a first data attribute of the first object data schema with a second data attribute of the specific configuration data object; and causing setting of the at least one value for the first data attribute to the first data value for the second data attribute.

5. The computer-implemented method of claim 1, wherein the converted data access application and the intermediary integration system are associated with a shared entity.

6. The computer-implemented method of claim 1, the computer-implemented method further comprising:

configuring, via the intermediary integration system in communication with the user- accessed application, a user-facing application associated with the user-accessed application to provide access to first operation via the intermediary integration system, wherein the first operation comprises a genericized operation corresponding to a specific operation of the converted data access application.

7. The computer-implemented method of claim 1, the computer-implemented method further comprising:

receiving, via the intermediary integration system, at least one operational request associated with the user-accessed application; and generating, via the intermediary integration system, the structured data object shell in response to the at least one operational request.

8. The computer-implemented method of claim 1, the computer-implemented method further comprising:

deleting the structured data object shell from the intermediary integration system.

9. The computer-implemented method of claim 1, wherein the structured data object shell is configured associated with a first operations package and the specific configuration data object is configured associated with a second operations package.

10. The computer-implemented method of claim 9, wherein the first operations package comprises a first CRUD operations package and the second operations package comprises a second CRUD operations package, the first CRUD operations package supporting at least one different CRUD operation than the second CRUD operations package.

11. The computer-implemented method of claim 9, wherein the second operations package comprises a specific operation performed at least in part via the converted data access application.

12. The computer-implemented method of claim 1, wherein the user-accessed application is associated with a user-facing application associated with a native look and feel, and wherein the user-facing application provides a first interface usable to generate the structured data object shell via an operation associated with the intermediary integration system, the first interface rendered based on the native look and feel associated with the user-accessed application.

13. The computer-implemented method of claim 1, wherein the user-accessed application is associated with a user-facing application operating on at least one first computing device, wherein the intermediary integration system comprises an applet simultaneously operating on the at least one first computing device.

14. The computer-implemented method of claim 1, wherein the intermediary integration system causes generation of the specific configuration data object utilizing a particular conversion algorithm identified based at least in part on an object type associated with the structured data object shell.

15. The computer-implemented method of claim 1, wherein the converted data access application is configured to provide first operation for interacting with the structured data object shell and second operation for interacting with the specific configuration data object.

16. The computer-implemented method of claim 1, the computer-implemented method further comprising:
receiving interaction data associated with the structured data object shell, the interaction data indicating a request to access a user-accessed application associated with the converted data access application; and
in response to receiving the interaction data, initiating execution of a second user-facing application associated with the converted data access application.

17. An apparatus comprising:
at least one processor; and
at least one memory storing instructions that, when executed by the at least one processor, cause the apparatus to:
receive, over a network from a first computing device running a user-facing application, a request from a user via the user-facing application and through a user-accessed application for access to one or more operations of a converted data access application, wherein the converted data access application has functionality that is not available in the user-accessed application;
identify a structured data object shell generated via the user-accessed application and stored via an intermediary integration system;
cause converting of a specific configuration data object associated with the converted data access application from the structured data object shell, wherein the specific configuration data object comprises a first format accessible by the converted data access application, wherein the structured data object shell comprises a second format accessible by the user-accessed application, and wherein the converting comprises causing at least:
translate at least one value of the structured data object shell to at least a first data value of the specific configuration data object; and
set at least a second data value of the specific configuration data object utilizing second data separate from the specific configuration data object;
transmit, over the network and to the converted data access application, the specific configuration data object to enable the converted data access application to provide access for the user-facing application to access the converted data access application; and
cause storing of the specific configuration data object via the converted data access application, wherein the storing of the specific configuration data object enables access to the specific configuration data object via the converted data access application.

18. The apparatus of claim 17, wherein the instructions further cause the apparatus to:
receive an operational request corresponding to at least one operation associated with the converted data access application;
receive source authentication information associated with a user; and
validate the source authentication information, wherein the structured data object shell is converted to the specific configuration data object based at least in part on the source authentication information associated with the user, and wherein the structured data object shell is generated before validation of the source authentication information.

19. The apparatus of claim 17, wherein the user-accessed application is associated with a user-facing application associated with a native look and feel, and wherein the user-facing application provides a first interface usable to generate the structured data object shell via an operation associated with the intermediary integration system, the first interface rendered based on the native look and feel associated with the user-accessed application.

20. A non-transitory computer-readable storage medium, the computer-readable storage medium including instructions that when executed by at least one processor, cause the at least one processor to:
receive, over a network from a first computing device running a user-facing application, a request from a user via the user-facing application and through a user-accessed application for access to one or more operations of a converted data access application, wherein the converted data access application has functionality that is not available in the user-accessed application;
identify a structured data object shell generated via the user-accessed application and stored via an intermediary integration system;
cause converting of a specific configuration data object associated with the converted data access application from the structured data object shell, wherein the specific configuration data object comprises a first format accessible by the converted data access application, wherein the structured data object shell comprises a second format accessible by the user-accessed application, and wherein the converting comprises causing at least:
translate at least one value of the structured data object shell to at least a first data value of the specific configuration data object; and
set at least a second data value of the specific configuration data object utilizing second data separate from the specific configuration data object;
transmit, over the network and to the converted data access application, the specific configuration data object to enable the converted data access application to provide access for the user-facing application to access the converted data access application; and
cause storing of the specific configuration data object via the converted data access application, wherein the storing of the specific configuration data object enables access to the specific configuration data object via the converted data access application.

* * * * *